US012732346B2

(12) United States Patent
Imanishi

(10) Patent No.: US 12,732,346 B2
(45) Date of Patent: Sep. 8, 2026

(54) INFORMATION PROCESSING DEVICE AND METHOD, AND INFORMATION PROCESSING SYSTEM

(71) Applicant: Sony Group Corporation, Tokyo (JP)

(72) Inventor: Masayuki Imanishi, Tokyo (JP)

(73) Assignee: Sony Group Corporation, Tokyo (JP)

( * ) Notice: Subject to any disclaimer, the term of this patent is extended or adjusted under 35 U.S.C. 154(b) by 28 days.

(21) Appl. No.: 18/834,578

(22) PCT Filed: Mar. 6, 2023

(86) PCT No.: PCT/JP2023/008227
§ 371 (c)(1),
(2) Date: Jul. 30, 2024

(87) PCT Pub. No.: WO2023/181871
PCT Pub. Date: Sep. 28, 2023

(65) Prior Publication Data

US 2025/0038964 A1 Jan. 30, 2025

(30) Foreign Application Priority Data

Mar. 22, 2022 (JP) ................................ 2022-045374

(51) Int. Cl.
*H04L 9/08* (2006.01)
*H04L 9/32* (2006.01)

(52) U.S. Cl.
CPC .......... *H04L 9/0825* (2013.01); *H04L 9/3231* (2013.01); *H04L 9/3247* (2013.01)

(58) Field of Classification Search
CPC .... H04L 9/0825; H04L 9/3231; H04L 9/3247
See application file for complete search history.

(56) References Cited

U.S. PATENT DOCUMENTS 7,047,418 B1 * 5/2006 Ferren ................ H04N 1/32106 713/176
10,042,993 B2 * 8/2018 Beigi ...................... G06F 21/32
2004/0111625 A1 * 6/2004 Duffy .................... H04L 9/3231 713/186

(Continued)

FOREIGN PATENT DOCUMENTS

EP 1971169 A1 9/2008
JP 2000056681 A 2/2000

(Continued)

OTHER PUBLICATIONS

International Search Report (PCT/ISA/210), International Application No. PCT/JP2023/008227, dated May 16, 2023.

*Primary Examiner* — Oleg Korsak
(74) *Attorney, Agent, or Firm* — Michael Best & Friedrich LLP

(57) ABSTRACT

Information processing with accurate content creator specification is disclosed. In one example, an authentication device associated with a user is authenticated, content information is generated according to an operation of the user, and in a case where the authentication device is authenticated, a content information file storing the content information and user information of the user is generated. Furthermore, by using the user information stored in the content information file, it is verified whether a creator of the content information stored in the content information file is valid.

17 Claims, 25 Drawing Sheets

(56) References Cited

U.S. PATENT DOCUMENTS

| | | | | |
|---|---|---|---|---|
| 2007/0033397 | A1* | 2/2007 | Phillips, II | H04L 63/045 713/168 |
| 2010/0197271 | A1* | 8/2010 | Yoshikawa | H04L 63/0492 713/168 |
| 2013/0171965 | A1 | 7/2013 | Schrecker | |
| 2013/0324081 | A1* | 12/2013 | Gargi | G06F 21/35 455/411 |
| 2015/0012742 | A1* | 1/2015 | Gorelik | H04L 63/0861 713/155 |
| 2016/0100314 | A1* | 4/2016 | Chung | H04L 63/0861 713/186 |
| 2018/0191501 | A1* | 7/2018 | Lindemann | H04L 9/0833 |
| 2019/0222424 | A1* | 7/2019 | Lindemann | H04L 9/3231 |
| 2019/0260589 | A1* | 8/2019 | Tang | H04W 12/06 |
| 2020/0014816 | A1* | 1/2020 | Speasl | H04N 1/00129 |
| 2022/0029825 | A1* | 1/2022 | Uhr | H04L 9/3239 |

FOREIGN PATENT DOCUMENTS

| | | | |
|---|---|---|---|
| JP | 2000201272 | A | 7/2000 |
| JP | 2003244138 | A | 8/2003 |
| JP | 2007036985 | A | 2/2007 |
| JP | 2007066212 | A | 3/2007 |
| JP | 2015084514 | A | 4/2015 |
| WO | 2007074596 | A1 | 7/2007 |
| WO | 2015019821 | A1 | 2/2015 |

* cited by examiner

FIG. 1

IMAGE MANAGEMENT SERVER
101
NETWORK
110
AUTHENTICATION DEVICE
102
IMAGING DEVICE
103
100

151
COMMUNICATION UNIT
152
ISSUANCE PROCESSING UNIT
153
REGISTRATION PROCESSING UNIT
154
USER AUTHENTICATION PROCESSING UNIT
155
CONFIRMATION UNIT
156
STORAGE UNIT
〈ADVANCE〉
AUTHENTICATION DEVICE PRIVATE KEY
AUTHENTICATION DEVICE PUBLIC KEY
DEVICE ID
〈PROCESSING〉
USER INFORMATION
102

Figure 4:
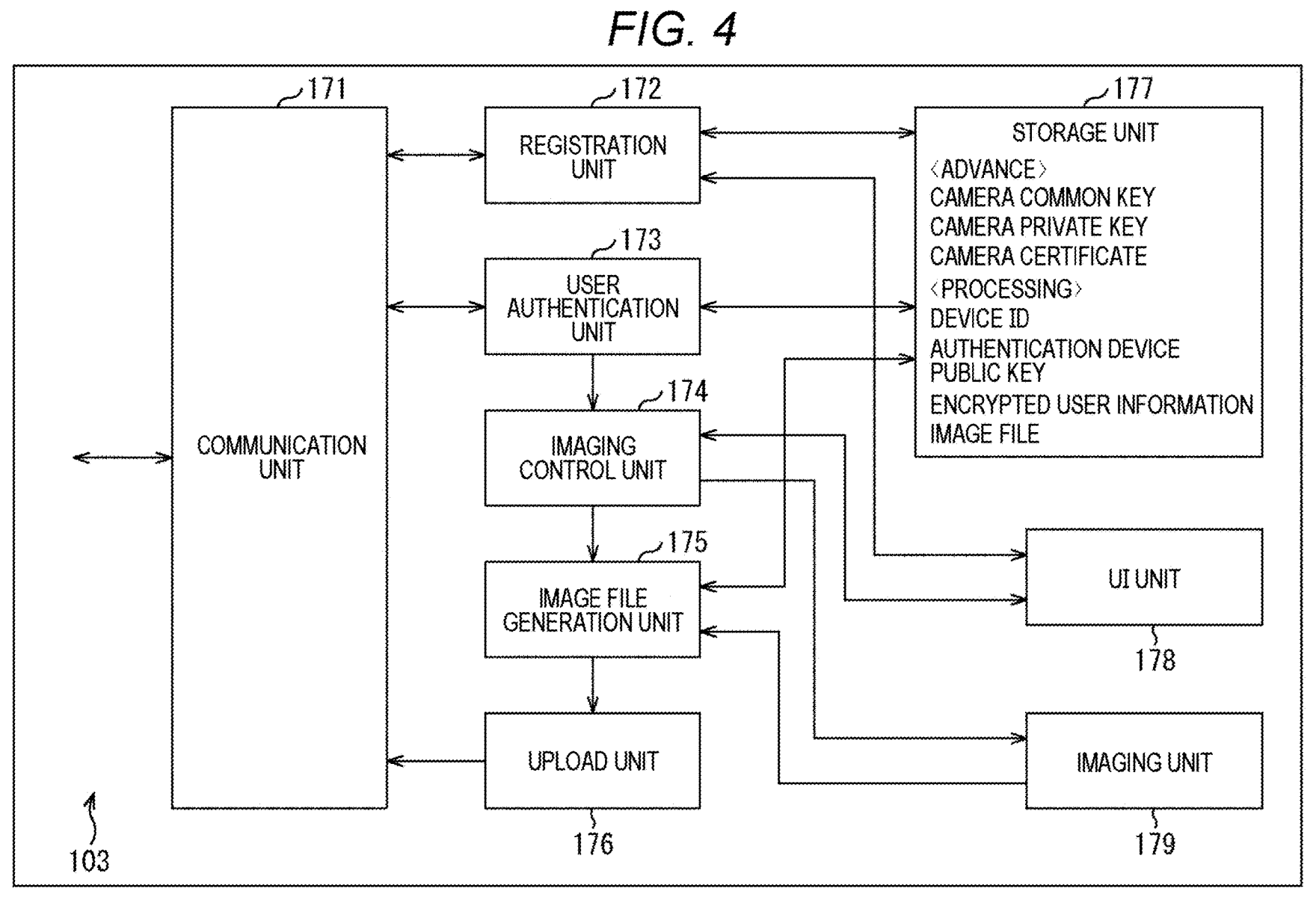

171 COMMUNICATION UNIT

172 REGISTRATION UNIT

173 USER AUTHENTICATION UNIT

174 IMAGING CONTROL UNIT

175 IMAGE FILE GENERATION UNIT

176 UPLOAD UNIT

177 STORAGE UNIT
〈ADVANCE〉
CAMERA COMMON KEY
CAMERA PRIVATE KEY
CAMERA CERTIFICATE
〈PROCESSING〉
DEVICE ID
AUTHENTICATION DEVICE PUBLIC KEY
ENCRYPTED USER INFORMATION
IMAGE FILE

178 UI UNIT

179 IMAGING UNIT

FIG. 6

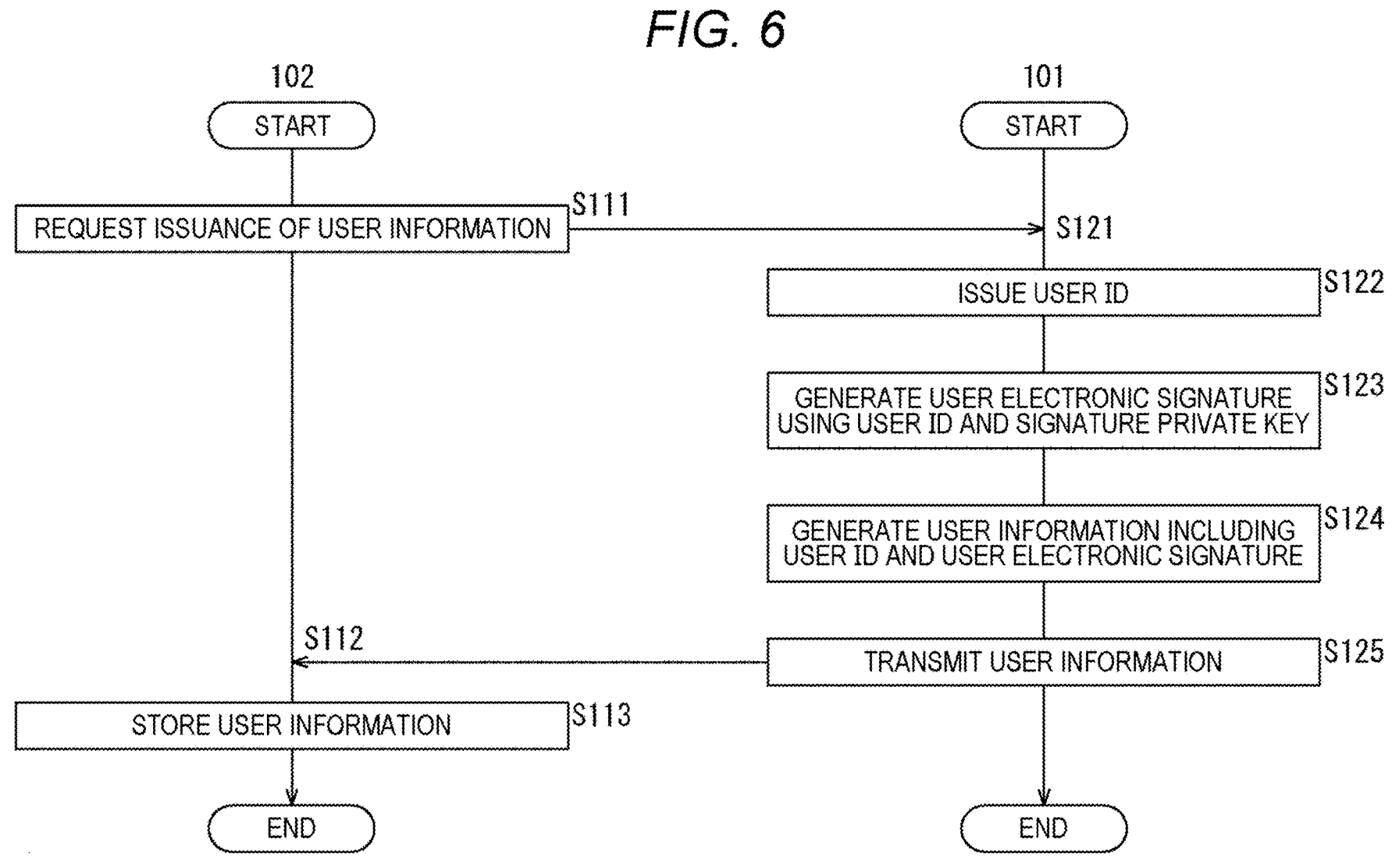

102
START
S111 REQUEST ISSUANCE OF USER INFORMATION
S112
S113 STORE USER INFORMATION
END

101
START
S121
S122 ISSUE USER ID
S123 GENERATE USER ELECTRONIC SIGNATURE USING USER ID AND SIGNATURE PRIVATE KEY
S124 GENERATE USER INFORMATION INCLUDING USER ID AND USER ELECTRONIC SIGNATURE
S125 TRANSMIT USER INFORMATION
END

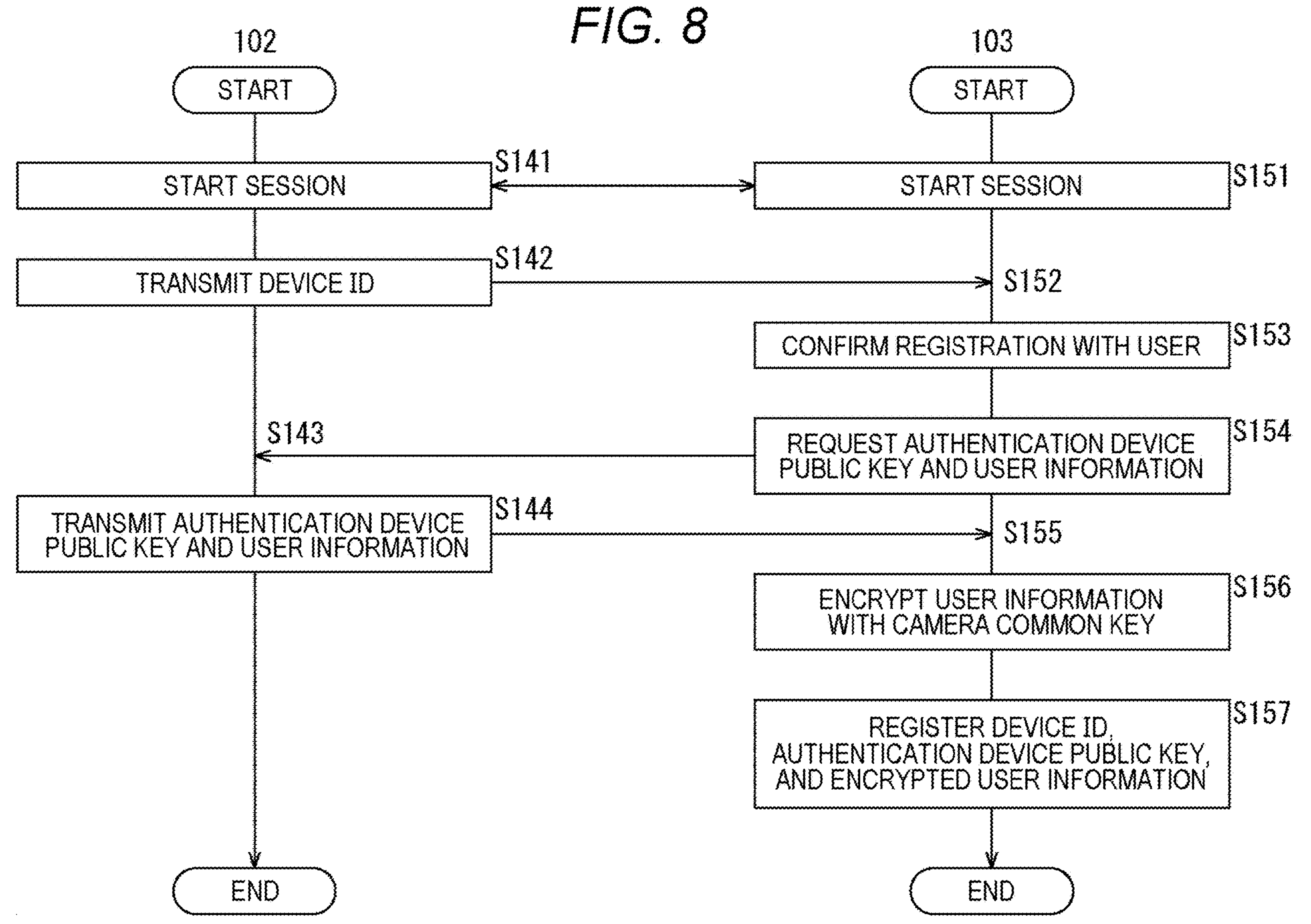
FIG. 8
102
START
START SESSION
S141
TRANSMIT DEVICE ID
S142
S143
TRANSMIT AUTHENTICATION DEVICE PUBLIC KEY AND USER INFORMATION
S144
END
103
START
START SESSION
S151
S152
CONFIRM REGISTRATION WITH USER
S153
REQUEST AUTHENTICATION DEVICE PUBLIC KEY AND USER INFORMATION
S154
S155
ENCRYPT USER INFORMATION WITH CAMERA COMMON KEY
S156
REGISTER DEVICE ID, AUTHENTICATION DEVICE PUBLIC KEY, AND ENCRYPTED USER INFORMATION
S157
END 210
AUTHENTICATION DEVICE (ID = A) HAS BEEN FOUND.
DO YOU WANT TO REGISTER?
REGISTRATION
CANCEL
211
212

| DEVICE ID | AUTHENTICATION DEVICE PUBLIC KEY | USER INFORMATION |
| --- | --- | --- |
| A | AB3249183······ | ENCRYPTED USER INFORMATION: USER ID; USER ELECTRONIC SIGNATURE |

177

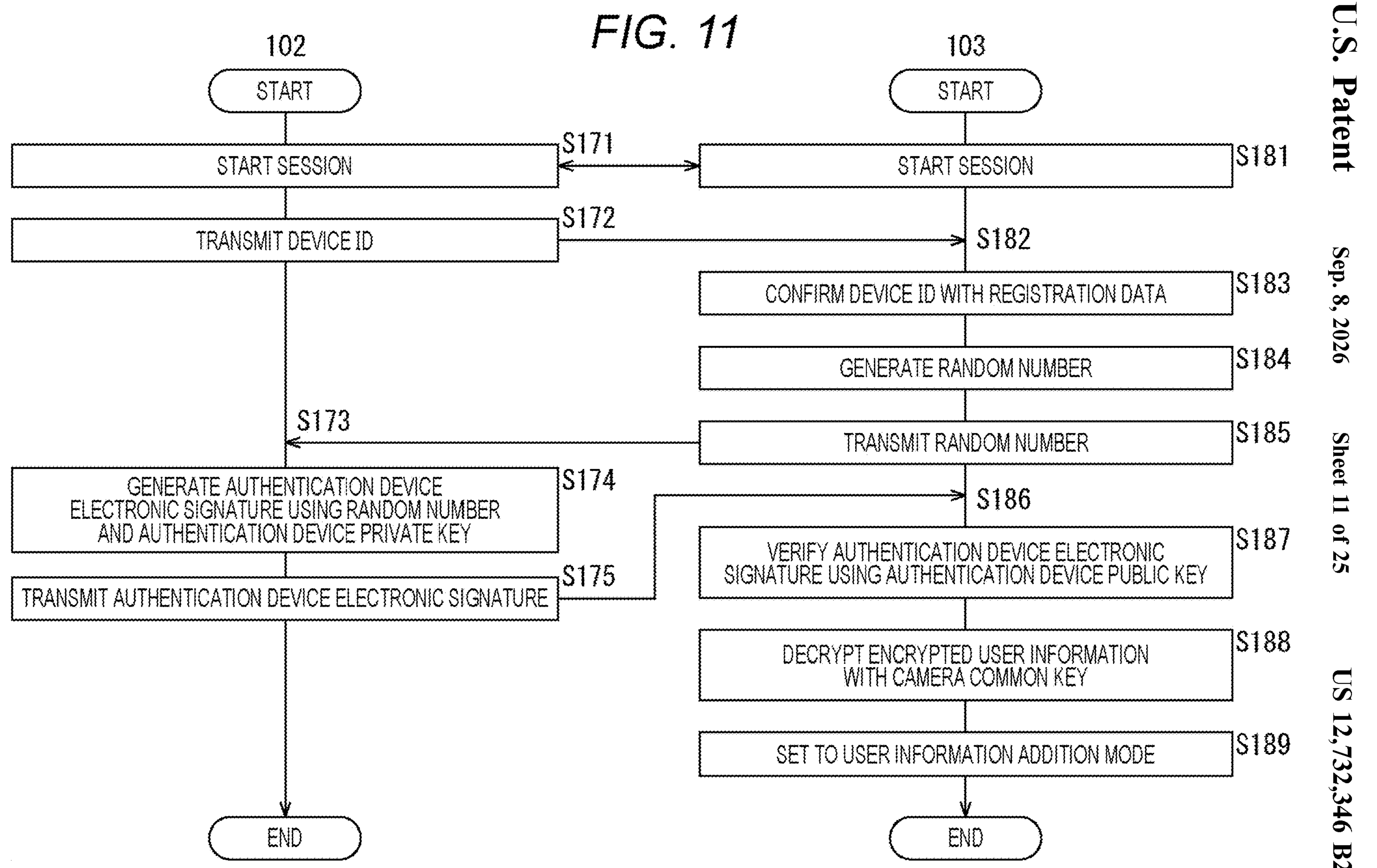
FIG. 11
102
START
S171
START SESSION
S172
TRANSMIT DEVICE ID
S173
S174
GENERATE AUTHENTICATION DEVICE ELECTRONIC SIGNATURE USING RANDOM NUMBER AND AUTHENTICATION DEVICE PRIVATE KEY
S175
TRANSMIT AUTHENTICATION DEVICE ELECTRONIC SIGNATURE
END
103
START
S181
START SESSION
S182
S183
CONFIRM DEVICE ID WITH REGISTRATION DATA
S184
GENERATE RANDOM NUMBER
S185
TRANSMIT RANDOM NUMBER
S186
S187
VERIFY AUTHENTICATION DEVICE ELECTRONIC SIGNATURE USING AUTHENTICATION DEVICE PUBLIC KEY
S188
DECRYPT ENCRYPTED USER INFORMATION WITH CAMERA COMMON KEY
S189
SET TO USER INFORMATION ADDITION MODE
END 102
START
MEASURE DISTANCE
S201
MAKE NOTIFICATION IN CASE OF BEING AWAY BY PREDETERMINED DISTANCE OR MORE
S202
S203
NO
TO BE ENDED?
S204
YES
END
103
START
S211
IN CASE OF BEING NOTIFIED, SWITCH TO MODE IN WHICH USER INFORMATION IS NOT ADDED
S212
CONFIRM CONNECTION
S213
IN CASE OF BEING DISCONNECTED, SWITCH TO MODE IN WHICH USER INFORMATION IS NOT ADDED
S214
TO BE ENDED?
S215
NO
YES
END

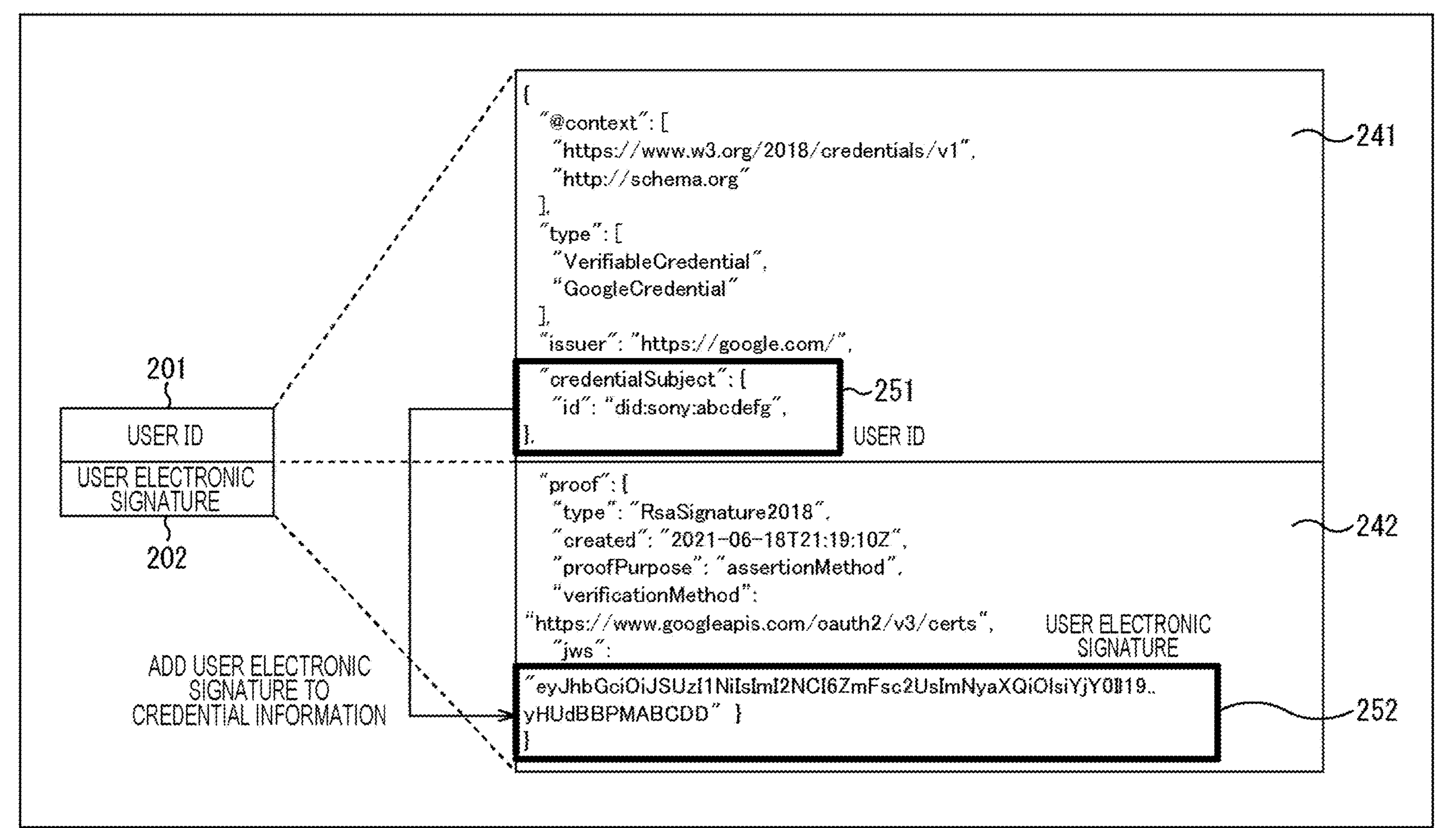
FIG. 15
201
USER ID
USER ELECTRONIC SIGNATURE
202
ADD USER ELECTRONIC SIGNATURE TO CREDENTIAL INFORMATION
{
"@context": [
"https://www.w3.org/2018/credentials/v1",
"http://schema.org"
],
"type": [
"VerifiableCredential",
"GoogleCredential"
],
"issuer": "https://google.com/",
"credentialSubject": {
"id": "did:sony:abcdefg",
},
241
251
USER ID
"proof": {
"type": "RsaSignature2018",
"created": "2021-06-18T21:19:10Z",
"proofPurpose": "assertionMethod",
"verificationMethod":
"https://www.googleapis.com/oauth2/v3/certs",
"jws":
"eyJhbGciOiJSUzI1NiIsImI2NCI6ZmFsc2UsImNyaXQiOlsiYjY0Il19..
yHUdBBPMABCDD" }
}
242
USER ELECTRONIC SIGNATURE
252

CAMERA ELECTRONIC SIGNATURE

CAMERA CERTIFICATE

Figure 17:
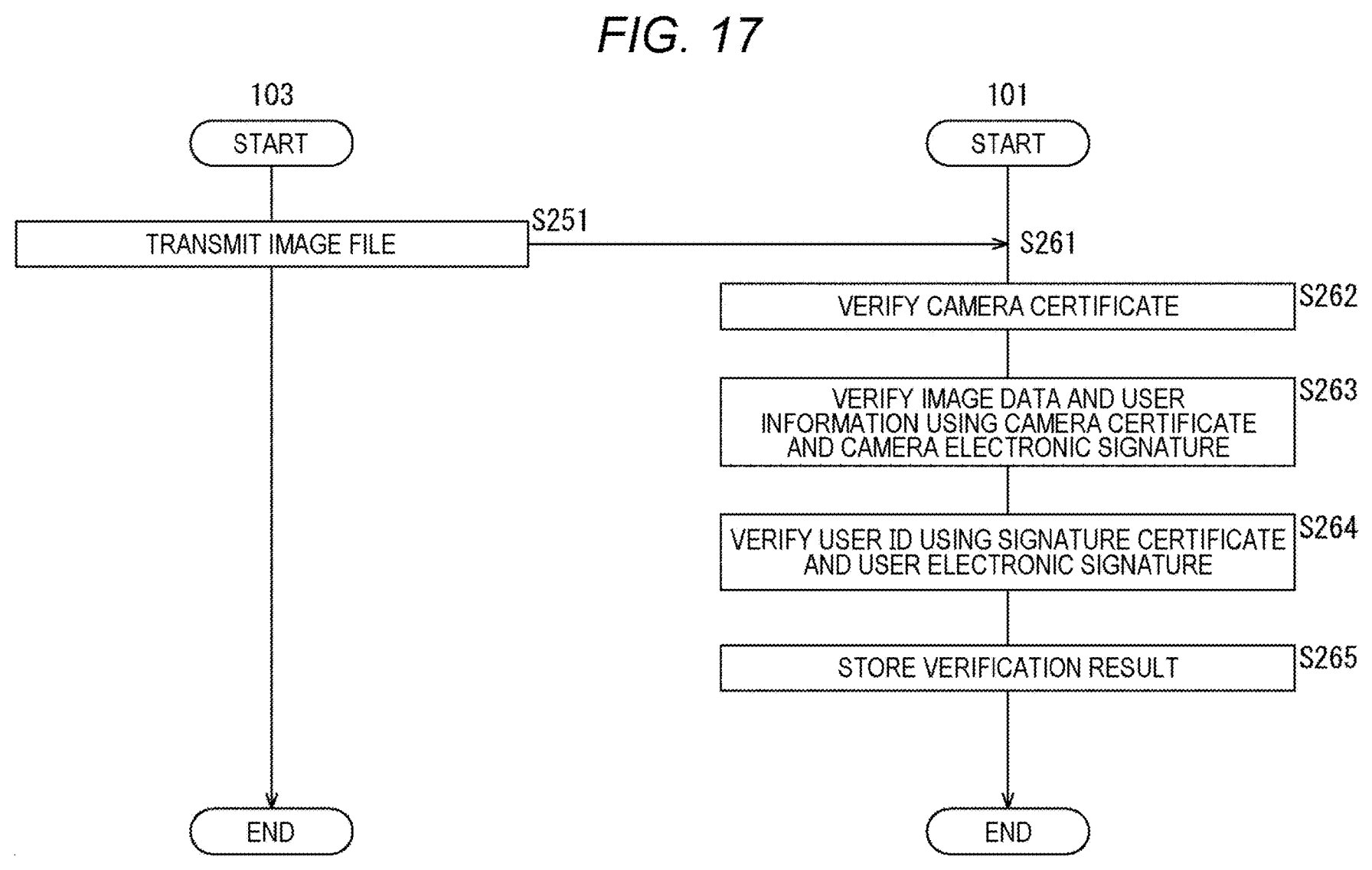

103
START
TRANSMIT IMAGE FILE
S251
END

101
START
S261
VERIFY CAMERA CERTIFICATE
S262
VERIFY IMAGE DATA AND USER INFORMATION USING CAMERA CERTIFICATE AND CAMERA ELECTRONIC SIGNATURE
S263
VERIFY USER ID USING SIGNATURE CERTIFICATE AND USER ELECTRONIC SIGNATURE
S264
STORE VERIFICATION RESULT
S265
END

156
STORAGE UNIT
〈ADVANCE〉
AUTHENTICATION DEVICE PRIVATE KEY
AUTHENTICATION DEVICE PUBLIC KEY
DEVICE ID
〈PROCESSING〉
USER INFORMATION
301
BIOMETRIC AUTHENTICATION UNIT
152
ISSUANCE PROCESSING UNIT
153
REGISTRATION PROCESSING UNIT
154
USER AUTHENTICATION PROCESSING UNIT
155
CONFIRMATION UNIT
151
COMMUNICATION UNIT
102

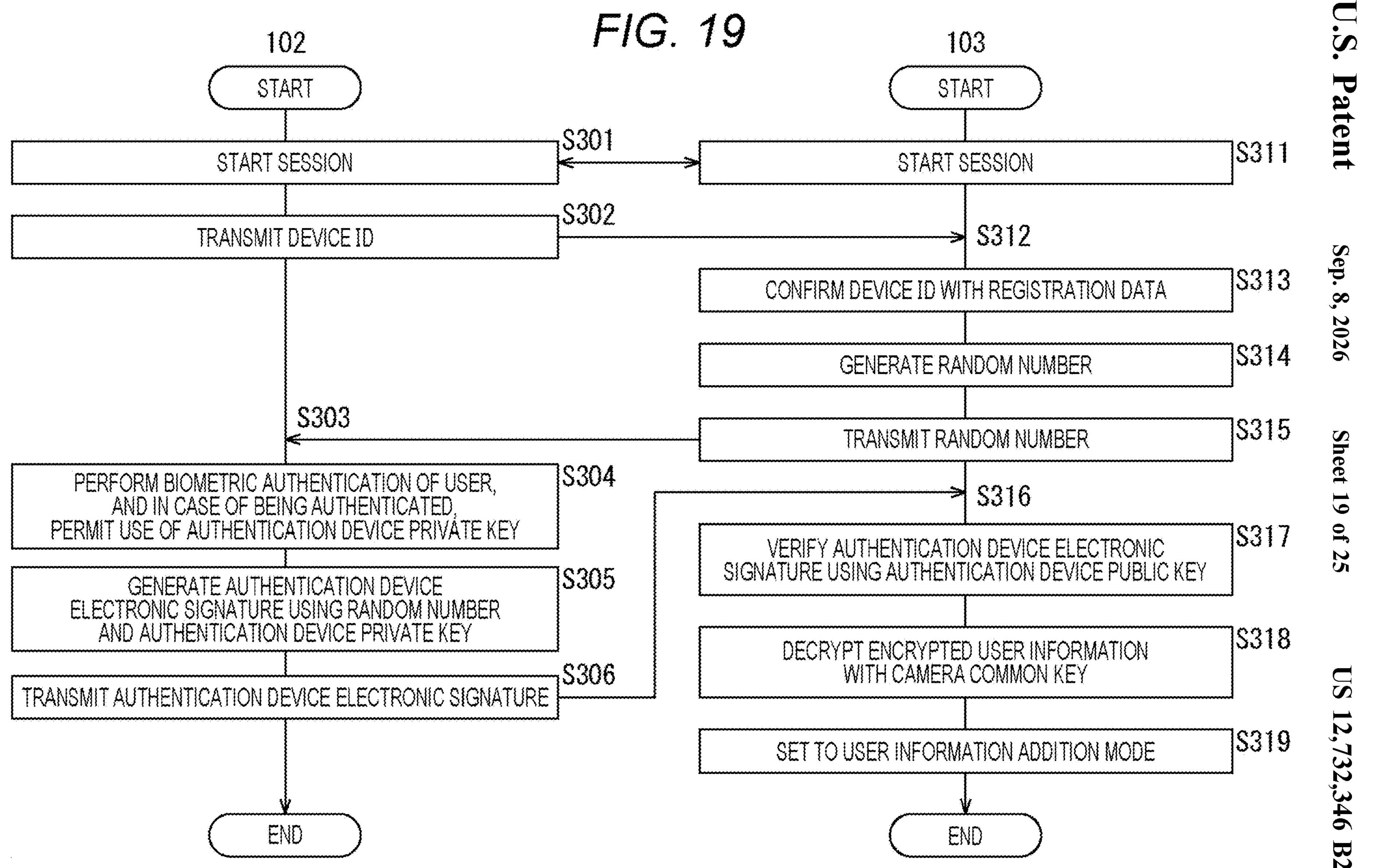
FIG. 19
102
START
START SESSION
S301
TRANSMIT DEVICE ID
S302
S303
PERFORM BIOMETRIC AUTHENTICATION OF USER, AND IN CASE OF BEING AUTHENTICATED, PERMIT USE OF AUTHENTICATION DEVICE PRIVATE KEY
S304
GENERATE AUTHENTICATION DEVICE ELECTRONIC SIGNATURE USING RANDOM NUMBER AND AUTHENTICATION DEVICE PRIVATE KEY
S305
TRANSMIT AUTHENTICATION DEVICE ELECTRONIC SIGNATURE
S306
END
103
START
START SESSION
S311
S312
CONFIRM DEVICE ID WITH REGISTRATION DATA
S313
GENERATE RANDOM NUMBER
S314
TRANSMIT RANDOM NUMBER
S315
S316
VERIFY AUTHENTICATION DEVICE ELECTRONIC SIGNATURE USING AUTHENTICATION DEVICE PUBLIC KEY
S317
DECRYPT ENCRYPTED USER INFORMATION WITH CAMERA COMMON KEY
S318
SET TO USER INFORMATION ADDITION MODE
S319
END

Figure 22:
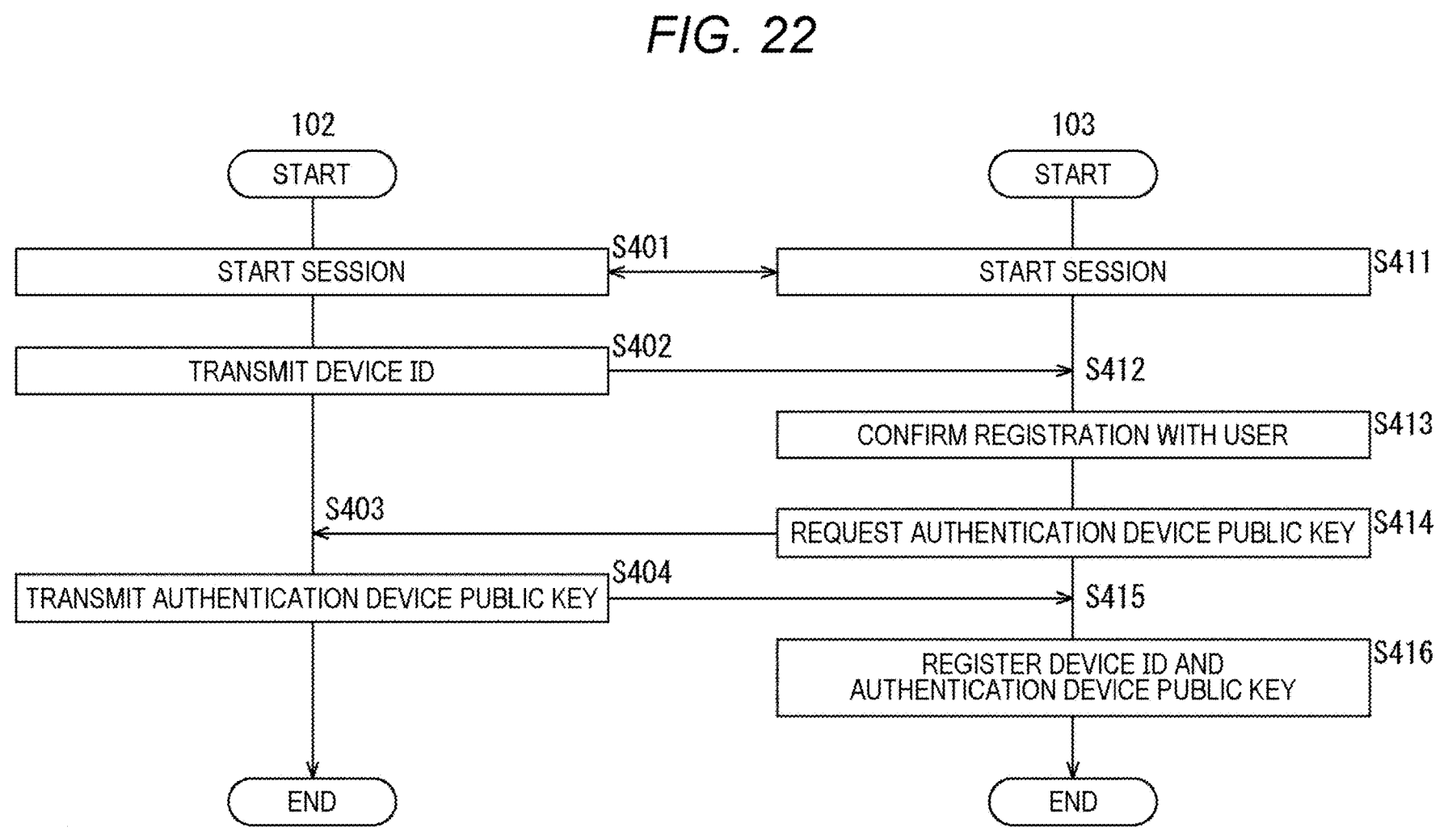

START

S401 START SESSION

S402 TRANSMIT DEVICE ID

S403

S404 TRANSMIT AUTHENTICATION DEVICE PUBLIC KEY

END

103

START

S411 START SESSION

S412

S413 CONFIRM REGISTRATION WITH USER

S414 REQUEST AUTHENTICATION DEVICE PUBLIC KEY

S415

S416 REGISTER DEVICE ID AND AUTHENTICATION DEVICE PUBLIC KEY

END

FIG. 24

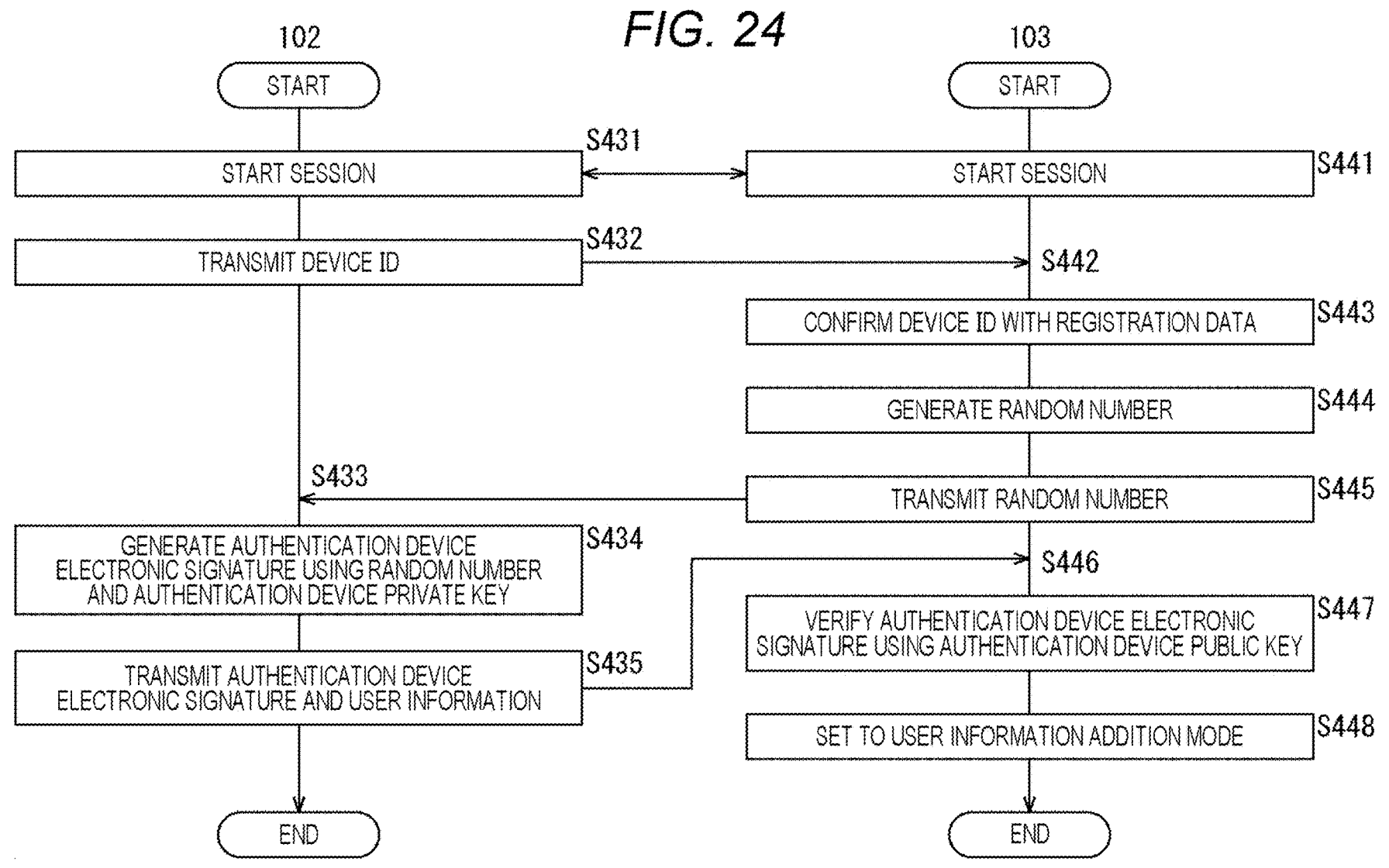

102
START
S431 START SESSION
S432 TRANSMIT DEVICE ID
S433
S434 GENERATE AUTHENTICATION DEVICE ELECTRONIC SIGNATURE USING RANDOM NUMBER AND AUTHENTICATION DEVICE PRIVATE KEY
S435 TRANSMIT AUTHENTICATION DEVICE ELECTRONIC SIGNATURE AND USER INFORMATION
END

103
START
S441 START SESSION
S442
S443 CONFIRM DEVICE ID WITH REGISTRATION DATA
S444 GENERATE RANDOM NUMBER
S445 TRANSMIT RANDOM NUMBER
S446
S447 VERIFY AUTHENTICATION DEVICE ELECTRONIC SIGNATURE USING AUTHENTICATION DEVICE PUBLIC KEY
S448 SET TO USER INFORMATION ADDITION MODE
END

INFORMATION PROCESSING DEVICE AND METHOD, AND INFORMATION PROCESSING SYSTEM

TECHNICAL FIELD

The present disclosure relates to an information processing device and method, and an information processing system, and more particularly, to an information processing device and method, and an information processing system capable of more accurately specifying a creator of content information stored in a content information file.

BACKGROUND ART

Conventionally, there has been a method of verifying the presence or absence of tampering of content information, information regarding a creator added to the content information, or the like, using an electronic signature. However, with this electronic signature, it has been difficult to verify whether the information regarding the creator added to the content information is valid.

Furthermore, an input/output device that authenticates an operation terminal brought in proximity and displays a screen according to a user has been considered (See, for example, Patent Document 1.).

CITATION LIST

Patent Document

Patent Document 1: Japanese Patent Application Laid-Open No. 2015-084514

SUMMARY OF THE INVENTION

Problems to be Solved by the Invention

However, in a method described in Patent Document 1, information regarding the creator is not added to the content information generated by the input/output device. Therefore, it is difficult to specify the creator of the content information on the basis of information stored in a content information file.

The present disclosure has been made in view of such a situation, and an object of the present disclosure is to more accurately specify a creator of content information stored in a content information file.

Solutions to Problems

An information processing device according to one aspect of the present technology is an information processing device including: an authentication unit that authenticates an authentication device associated with a user; a content information generation unit that generates content information according to an operation of the user; and a content information file generation unit that generates a content information file that stores the content information and user information of the user in a case where the authentication device is authenticated.

An information processing method according to one aspect of the present technology is an information processing method including: authenticating an authentication device associated with a user; generating content information according to an operation of the user; and generating a content information file that stores the content information and user information of the user in a case where the authentication device is authenticated.

An information processing device according to another aspect of the present technology is an information processing device including: a communication unit that communicates with another device; and a confirmation unit that regularly or irregularly repeatedly confirms whether a distance to the another device is closer than a predetermined threshold using communication with the another device, in which the confirmation unit makes a notification to the another device via the communication unit in a case of determining that the distance is more than or equal to the threshold.

An information processing method according to another aspect of the present technology is an information processing method including: by using communication with another device, regularly or irregularly repeatedly confirming whether a distance to the another device is closer than a predetermined threshold, and making a notification to the another device in a case where it is determined that the distance is more than or equal to the threshold.

An information processing device according to still another aspect of the present technology is an information processing device including a verification unit that verifies, by using user information stored in a content information file, whether a creator of content information stored in the content information file is valid.

An information processing method according to still another aspect of the present technology is an information processing method including verifying, by using user information stored in a content information file, whether a creator of content information stored in the content information file is valid.

An information processing system according to still another aspect of the present technology is an information processing system including a content information generation device and a verification device, in which the content information generation device includes: a content information generation unit that generates content information according to an operation of a user; an authentication unit that authenticates an authentication device associated with the user; and a content information file generation unit that, in a case where the authentication device is authenticated, generates a content information file that stores the content information and user information of the user supplied from the authentication device, and the verification device includes a verification unit that verifies whether a creator of the content information included in the content information file is valid using the user information included in the content information file.

In the information processing device and method according to one aspect of the present technology, the authentication device associated with the user is authenticated, content information is generated according to an operation of the user, and in a case where the authentication device is authenticated, a content information file that stores the content information and user information of the user is generated.

In the information processing device and method according to another aspect of the present technology, whether the distance to the another device is closer than a predetermined threshold is regularly or irregularly repeatedly confirmed by using communication with the another device, and in a case where it is determined that the distance is more than or equal to the threshold, a notification is made to the another device.

In the information processing device and method according to still another aspect of the present technology, whether a creator of the content information stored in the content information file is valid is verified using the user information stored in the content information file.

In the information processing system according to still another aspect of the present technology, in the content information generation device, content information is generated according to an operation of the user, the authentication device associated with the user is authenticated, and in a case where the authentication device is authenticated, the content information file storing the content information and the user information of the user supplied from the authentication device is generated, and in the verification device, whether a creator of the content information included in the content information file is valid is verified using the user information included in the content information file.

BRIEF DESCRIPTION OF DRAWINGS

FIG. 1 is a diagram illustrating a main configuration example of an image processing system.

FIG. 4 is a block diagram illustrating a main configuration example of an imaging device.

FIG. 6 is a flowchart explaining an example of a flow of issuance processing.

FIG. 8 is a flowchart explaining an example of a flow of registration processing.

FIG. 10 is a diagram illustrating a main configuration example of registration data.

FIG. 11 is a flowchart explaining an example of a flow of authentication processing.

FIG. 15 is a diagram illustrating an example of syntax of user information.

FIG. 16 is a diagram illustrating a main configuration example of an image file.

FIG. 17 is a flowchart explaining an example of a flow of the verification processing.

FIG. 19 is a flowchart explaining an example of a flow of authentication processing.

FIG. 22 is a flowchart explaining an example of a flow of registration processing.

FIG. 24 is a flowchart explaining an example of a flow of authentication processing.

MODE FOR CARRYING OUT THE INVENTION

Figure 2:
FIG. 2 is a block diagram illustrating a main configuration example of an image management server.

Hereinafter, a mode for carrying out the present disclosure (hereinafter referred to as an embodiment) will be described. Note that the description will be made in the following order.

1. Documents and the like supporting technical contents and technical terms
2. Verification of creator
3. First embodiment (image processing system)
4. Second embodiment (biometric authentication)
5. Third embodiment (provision of user information at the time of authentication)
6. Supplementary note

1. Documents and the Like Supporting Technical Content and Technical Terms

The scope disclosed in the present technology includes not only the contents described in the embodiments but also the contents described in the following patent document and the like known at the time of filing, the contents of other documents referred to in the following patent document, and the like.

Patent Document 1: (described above)

That is, the contents described in the above-described patent document, the contents of other documents referred to in the above-described patent document, and the like are also grounds for determining the support requirement.

2. Verification of Creator

Conventionally, there has been a method of storing information regarding a creator in a content information file so that a recipient of the file can specify the creator of the content information. At that time, there is a method of verifying the presence or absence of information tampering using an electronic signature. However, with this electronic signature, it is difficult to verify whether the information stored in the content information file is valid. For example, in a case where information of an invalid creator is added to content information and an electronic signature of the content information and metadata is generated, it is difficult to detect that information of the invalid creator is added to the content information on the basis of the electronic signature.

Therefore, in the method of generating the metadata (creator information or the like) manually or the like to be added to the content information, there is a possibility that reliability (validity) of the metadata is reduced. For example, in the case of this method, a user different from the actual user can be set as an image contributor. Furthermore, after the image contributor is set, the image contributor may be replaced.

Meanwhile, Patent Document 1 discloses an input/output device that authenticates an operation terminal brought in proximity and displays a screen corresponding to a user. In the case of this method, the input/output device authenticates the operation terminal to specify the user corresponding to the operation terminal.

However, in the case of this method, the creator's information is not added to the content information generated by the input/output device. Therefore, it is difficult to specify the creator of the content information on the basis of information stored in a content information file.

Therefore, an authentication device associated with a user is authenticated, content information is generated according to an operation of the user, and in a case where the authentication device is authenticated, a content information file storing the content information and user information of the user is generated.

For example, an information processing device includes an authentication unit that authenticates an authentication device associated with a user, a content information generation unit that generates content information according to an operation of the user, and a content information file generation unit that generates a content information file that stores the content information and user information of the user in a case where the authentication device is authenticated.

With this configuration, the recipient of the content information file can verify whether the creator of the content information is valid on the basis of the information (user information) included in the content information file. Therefore, the recipient of the content information file can more accurately specify the creator of the content information stored in the content information file.

Furthermore, whether the creator of the content information stored in the content information file is valid is verified by using the user information stored in the content information file.

For example, an information processing device includes a verification unit that verifies whether a creator of content information stored in a content information file is valid by using user information stored in the content information file.

With this configuration, the information processing device that is the recipient of the content information file can more accurately specify the creator of the content information stored in the content information file.

For example, in an information processing system, a content information generation device includes: a content information generation unit that generates content information according to an operation of a user; an authentication unit that authenticates an authentication device associated with the user; and a content information file generation unit that, in a case where the authentication device is authenticated, generates a content information file that stores the content information and user information of the user supplied from the authentication device, and a verification device includes a verification unit that verifies whether a creator of the content information included in the content information file is valid using the user information included in the content information file.

With this configuration, in the information processing system, the verification device that is the recipient of the content information file generated by the content information generation device can more accurately specify the creator of the content information stored in the content information file.

Note that whether a distance to another device is closer than a predetermined threshold may be regularly or irregularly repeatedly confirmed by using communication with the another device, and in a case where it is determined that the distance is more than or equal to the threshold, a notification is made to the another device.

For example, an information processing device may include a communication unit that communicates with another device, and a confirmation unit that regularly or irregularly and repeatedly confirms whether a distance to the another device is closer than a predetermined threshold by using communication with the another device. In a case where the confirmation unit determines that the distance is more than or equal to the threshold, the confirmation unit may make a notification to the another device via the communication unit.

With this notification, the another device can grasp whether the information processing device is closer or farther than a predetermined distance (threshold). As a result, another device can authenticate the information processing device according to the distance to the information processing device. For example, in a case where the information processing device is in close proximity (that is, in a case where a distance between the another device and the information processing device is closer than a threshold), the another device may authenticate the information processing device.

Furthermore, in a case where the information processing device is not in proximity (that is, in a case where the distance between another device and the information processing device is more than or equal to the threshold), another device may not authenticate the information processing device.

3. First Embodiment

<Image Processing System>

Figure 1:
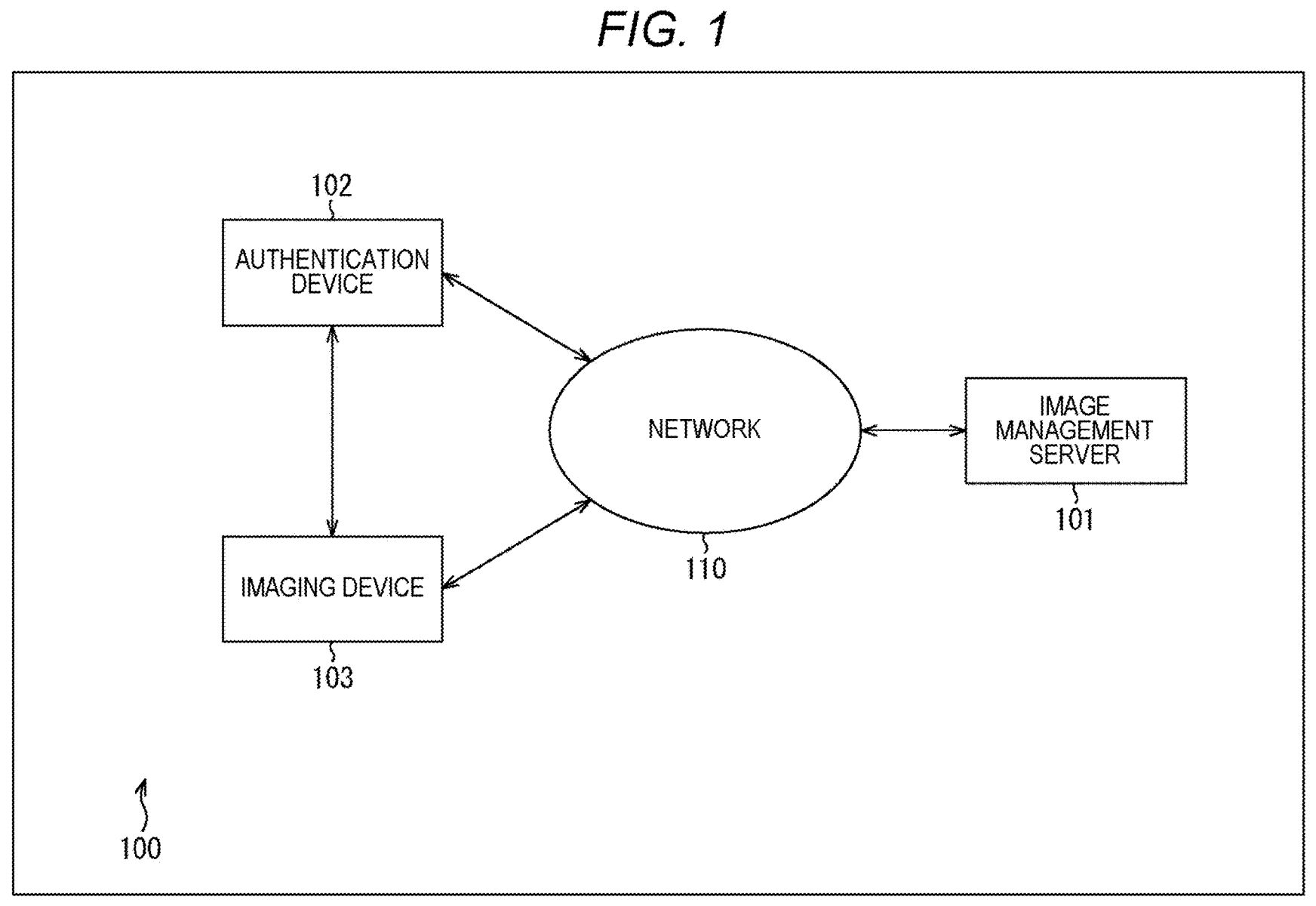

FIG. 1 is a block diagram illustrating an example of a configuration of an image processing system which is an aspect of an information processing system to which the present technology is applied. An image processing system 100 illustrated in FIG. 1 is a system that uses a captured image (image data thereof) as content information and performs processing related to the content information. Note that, in the following description, image data of a captured image may be simply referred to as a captured image.

As illustrated in FIG. 1, the image processing system 100 includes an image management server 101, an authentication device 102, and an imaging device 103. Each of the image management server 101 to the imaging device 103 is communicably connected to a network 110. The image management server 101 to the imaging device 103 can communicate with other devices via the network 110. Furthermore, the authentication device 102 and the imaging device 103 can also perform communication by near field communication.

The image management server 101 performs processing related to management of an image file supplied from the imaging device 103. For example, the image management server 101 may communicate with the authentication device 102 and the imaging device 103. For example, the image management server 101 may acquire and store the image file generated by the imaging device 103. Furthermore, the image management server 101 may verify whether a creator (that is, an image contributor) of the captured image stored in the image file is valid by using information (user information) regarding the creator stored in the image file. Furthermore, the image management server 101 may issue the user information.

The authentication device 102 performs processing related to authentication of the user of the imaging device 103. For example, the authentication device 102 may communicate with the image management server 101 and the imaging device 103. For example, the authentication device 102 may request issuance of the user information. Furthermore, the authentication device 102 may register information regarding the authentication device 102 in the imaging device 103. Furthermore, the authentication device 102 may cause the imaging device 103 to authenticate itself. Furthermore, the authentication device 102 may regularly or irregularly repeatedly confirm whether a distance to the imaging device 103 is closer than a predetermined threshold using communication with the imaging device 103.

The imaging device 103 performs processing related to generation of a captured image (still image). For example, the imaging device 103 may communicate with the image management server 101 and the authentication device 102. For example, the imaging device 103 may authenticate the authentication device 102 brought close to it. Furthermore, the imaging device 103 may capture an image of a subject according to an operation of the user (image contributor) and generate image data of the captured image. Furthermore, the imaging device 103 may generate an image file that stores (the image data of) the captured image. Furthermore, the imaging device 103 may add the user information corresponding to the authenticated authentication device 102 to the captured image and store the captured image in the image file. The user information is information regarding the image contributor. Furthermore, the imaging device 103 may transmit the image file to the image management server 101.

In the image processing system 100, the image management server 101 is a verification device that verifies whether the creator of the content information is valid, and the imaging device 103 is a content information generation device that generates the content information. That is, in the image processing system 100, (the image data of) the captured image is the content information, and the image contributor is a creator of the content information. Furthermore, the image file is a content information file that stores the content information.

Note that the user of the authentication device 102 and the user of the imaging device 103 are the same. Here, the user indicates a user (operator) or an owner of the device. The user may be an individual, or may be a corporation or an organization. Furthermore, the user of the authentication device 102 and the user of the imaging device 103 may be actually the same, or may be in a relationship that can be regarded as being practically the same due to a contract or the like.

In the image processing system 100, the imaging device 103 captures an image of a subject according to an operation of the user (image contributor) and generates a captured image. Furthermore, the imaging device 103 authenticates the authentication device 102 associated with the user. Furthermore, in a case where the authentication device 102 is authenticated, the imaging device 103 generates an image file that stores the captured image and the user information supplied from the authentication device 102. Then, the image management server 101 verifies whether the image contributor of the captured image included in the image file is valid using the user information included in the image file.

In this way, in the image processing system 100, the image management server 101 that is a recipient of the image file generated by the imaging device 103 can more accurately specify the image contributor of the captured image stored in the image file. At that time, as described above, the image management server 101 can verify the image contributor using the user information obtained from the authentication device 102 used by the image contributor. Therefore, the image management server 101 can more accurately specify the information of the image contributor to be added to the captured image in the imaging device 103 than a case where the information is generated manually or the like.

Therefore, the image management server 101 can manage, for example, whether or not the information of the image contributor stored in the image file is valid. Furthermore, the image management server 101 can provide whether or not the information of the image contributor stored in the image file is valid to a provision destination of the image file. Furthermore, the image management server 101 can prevent (delete) an image file that stores invalid information.

Note that, in the example of FIG. 1, the image processing system 100 includes one image management server 101, one authentication device 102, and one imaging device 103, but the number of each device is arbitrary. A plurality of the image management servers 101, a plurality of the authentication devices 102, and a plurality of the imaging devices 103 may be provided, respectively.

<Image Management Server>

FIG. 2 is a block diagram illustrating a main configuration example of the image management server 101 which is an aspect of the information processing device to which the present technology is applied. Note that, in FIG. 2, main processing units, data flows, and the like are illustrated, and those illustrated in FIG. 2 are not necessarily all. That is, the image management server 101 may include a device or a processing unit not illustrated as a block in FIG. 2. Furthermore, there may be a flow of data or processing that is not illustrated as an arrow or the like in FIG. 2.

The image management server 101 may be implemented by any configuration. For example, the image management server 101 may be configured as hardware or software. For example, the image management server 101 may include a single computer or a plurality of computers. Furthermore, the image management server 101 may be configured as a virtual computer. Furthermore, the image management server 101 may be configured as a so-called cloud server.

As illustrated in FIG. 2, the image management server 101 includes a communication unit 131, a user information issuance unit 132, an image contributor verification unit 133, and a storage unit 134.

The communication unit 131 performs processing related to communication with another device. For example, the communication unit 131 may communicate with the authentication device 102 and the imaging device 103 via the network 110. For example, the communication unit 131 may acquire information supplied from another device through the communication, and supply the information to the user information issuance unit 132 and the image contributor verification unit 133. Furthermore, the communication unit 131 may acquire the information supplied from the user information issuance unit 132 or the image contributor verification unit 133, and supply the information to another device through the communication.

The user information issuance unit 132 performs processing related to issuance of the user information. That is, the user information issuance unit 132 can also be referred to as an issuance unit. For example, the user information issuance unit 132 may acquire a user information issuance request via the communication unit 131.

Furthermore, the user information issuance unit 132 may issue the user information in response to the request. For example, the user information issuance unit 132 may generate a user ID (user identification information) corresponding to a request source of the user information. Furthermore, the user information issuance unit 132 may acquire a private key (also referred to as a signature private key) unique to the image management server 101 from the storage unit 134.

Furthermore, the user information issuance unit 132 may generate an electronic signature (also referred to as a user electronic signature) using the generated user ID and the acquired signature private key. For example, the user information issuance unit 132 may generate the user electronic signature by hashing the user ID and encrypting the user ID with the signature private key.

Furthermore, the user information issuance unit 132 may supply the generated user ID and user electronic signature to the authentication device 102 (that is, a request source) via the communication unit 131 as the user information. Furthermore, the user information issuance unit 132 may supply the user information to the storage unit 134 and store the user information in the storage unit.

The image contributor verification unit 133 performs processing related to verification of the image contributor. That is, the image contributor verification unit 133 can also be referred to as a verification unit. For example, the image contributor verification unit 133 may verify whether the image contributor of the captured image stored in the image file is valid by using the user information stored in the image file.

For example, the image contributor verification unit 133 may acquire the image file supplied from the imaging device 103 via the communication unit 131. Furthermore, the image contributor verification unit 133 may supply the image file to the storage unit 134 and store the image file in the storage unit.

At least a captured image is stored in the image file. Furthermore, other information may be stored in the image file. For example, metadata (for example, user information) of the captured image may be stored in the image file.

Furthermore, a camera electronic signature may be stored in the image file. The camera electronic signature is an electronic signature used for verifying the captured image (and metadata thereof) stored in an image file. This camera electronic signature may be obtained by hashing a captured image (and metadata in a case where the metadata (for example, user information) is added to the captured image) and encrypting the hashed captured image with a private key (also referred to as a camera private key) unique to the imaging device 103.

Furthermore, a camera certificate may be stored in the image file. The camera certificate is a certificate for a camera private key. The camera certificate may include a public key (also referred to as a camera public key) corresponding to the camera private key.

For example, the image contributor verification unit 133 may verify whether the camera certificate is valid. This verification method is arbitrary. For example, the image contributor verification unit 133 may verify whether the camera certificate is valid by inquiring of a certificate authority in which information of the camera private key and the camera public key is registered.

Furthermore, in a case where the camera certificate is determined to be valid, the image contributor verification unit 133 may verify whether or not the captured image and the metadata (the user information and the like) have been tampered with, using the camera certificate and the camera electronic signature. For example, the image contributor verification unit 133 may perform this verification by comparing a hash of the image and the metadata (user information) with a decryption of the camera electronic signature with the camera public key.

For example, in a case where it is determined that the captured image and the metadata (user information and the like) have not been tampered with, the image contributor verification unit 133 may verify whether or not the user ID has been tampered with. For example, the image contributor verification unit 133 may verify the user ID using the signature certificate and the user electronic signature. The signature certificate is a certificate for a signature private key. The signature certificate may include a public key (also referred to as a signature public key) corresponding to the signature private key. For example, the image contributor verification unit 133 may perform this verification by comparing a hash of the user ID with a decryption of the user electronic signature with the signature public key.

Furthermore, in a case where it is determined that the user ID has not been tampered with, the image contributor verification unit 133 may verify whether the user ID is valid. For example, the image contributor verification unit 133 may confirm whether the user ID exists in the user information generated by the user information issuance unit 132 and stored in the storage unit 134. That is, the image contributor verification unit 133 may confirm whether the user information is the user information issued by the user information issuance unit 132.

As described above, in the case of determining that the user ID stored in the image file has been issued by the user information issuance unit 132 and has not been tampered with, the image contributor verification unit 133 may determine that the image contributor of the captured image stored in the image file is valid.

Furthermore, the image contributor verification unit 133 may supply information indicating a verification result as described above to the storage unit 134 and store the information in the storage unit.

The storage unit 134 includes an arbitrary storage medium such as a hard disk or a semiconductor memory, and performs processing related to storage and reading of arbitrary information. For example, the storage unit 134 may store a signature private key or a signature certificate (signature public key) in advance. Note that "in advance" indicates at least before the information is used. That is, the storage unit 134 may store these pieces of information, for example, at the time of shipment from the factory or after shipment from the factory. Note that the signature private key is a private key unique to the image management server 101. The signature certificate is a certificate for a signature private key. The signature certificate may include a signature public key. The signature public key is a public key corresponding to the signature private key.

Furthermore, the storage unit 134 may read the signature private key in response to a request from the user information issuance unit 132 and supply the signature private key to the user information issuance unit 132. Furthermore, the reading and storage unit 134 may read the signature certificate in response to a request from the image contributor verification unit 133 and supply the signature certificate to the image contributor verification unit 133.

Furthermore, the storage unit 134 may acquire and store the user information supplied from the user information issuance unit 132. Furthermore, the storage unit 134 may acquire and store the image file supplied from the image contributor verification unit 133. Furthermore, the storage unit 134 may read the user information in response to a request from the image contributor verification unit 133 and supply the user information to the image contributor verification unit 133. Furthermore, the storage unit 134 may acquire and store information indicating the verification result supplied from the image contributor verification unit 133.

In the image management server 101 having such a configuration, for example, the image contributor verification unit 133 verifies whether the image contributor of the captured image stored in the image file is valid using the user information stored in the image file. With this configuration, the image management server 101 that is the recipient of the image file generated by the imaging device 103 can more accurately specify the image contributor of the captured image stored in the image file.

Therefore, the image management server 101 can manage, for example, whether or not the information of the image contributor stored in the image file is valid. Furthermore, the image management server 101 can provide whether or not the information of the image contributor stored in the image file is valid to a provision destination of the image file. Furthermore, the image management server 101 can prevent (delete) an image file that stores invalid information.

Furthermore, for example, the user information issuance unit 132 issues the user information, and in a case where the user information issued by the user information issuance unit 132 is included in the image file, the image contributor verification unit 133 determines that the information of the image contributor stored in the image file is valid. In this manner, by verifying whether the image contributor is valid using the user information issued by the image management server 101, the image management server can more accurately specify the image contributor of the captured image stored in the image file.

Furthermore, for example, as described above, the user information includes the user identification information and the user electronic signature, and the image contributor verification unit 133 verifies whether or not the user information issued by the user information issuance unit 132 is included in the image file, using the user information and the signature public key. That is, the image contributor verification unit 133 further verifies whether or not the user information has been tampered with, using the user electronic signature. By doing so, the image management server 101 can more accurately specify the image contributor of the captured image stored in the image file.

<Authentication Device>

Figure 3:
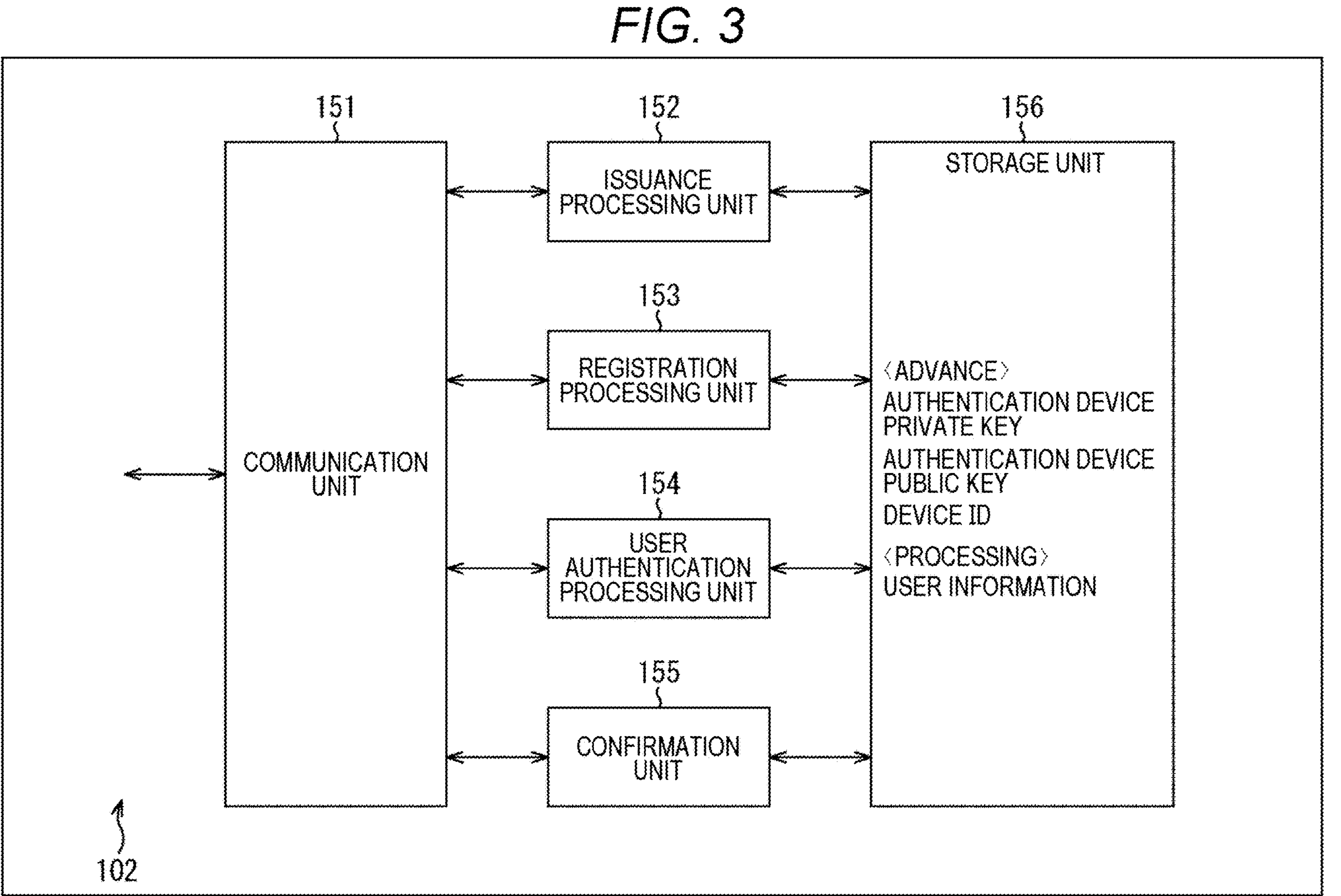
FIG. 3 is a block diagram illustrating a main configuration example of an authentication device.

FIG. 3 is a block diagram illustrating a main configuration example of the authentication device 102 which is an aspect of an information processing device to which the present technology is applied. Note that, in FIG. 3, principal ones among processing units, data flows and the like are illustrated, and not all of them are illustrated in FIG. 3. That is, the authentication device 102 may include a device or a processing unit that is not illustrated as a block in FIG. 3. Furthermore, there may be a flow of data or processing that is not illustrated as an arrow or the like in FIG. 3.

The authentication device 102 may be implemented with any configuration. For example, the authentication device 102 may be a dedicated device. Furthermore, the authentication device 102 may be, for example, a portable information processing terminal device such as a so-called smartphone, a smart watch, a tablet terminal, a notebook personal computer, or the like. Furthermore, the authentication device 102 may include a single device or a plurality of devices.

As illustrated in FIG. 3, the authentication device 102 includes a communication unit 151, an issuance processing unit 152, a registration processing unit 153, a user authentication processing unit 154, a confirmation unit 155, and a storage unit 156.

The communication unit 151 performs processing related to communication with another device. For example, the communication unit 151 may communicate with the image management server 101 and the imaging device 103 via the network 110. Furthermore, the communication unit 151 may perform near field communication with the imaging device 103.

The near field communication may be wired communication or wireless communication. For example, the authentication device 102 and the imaging device 103 may be connected by a communication cable of a predetermined communication standard and perform wired communication via the communication cable. This communication standard is arbitrary. For example, a universal serial bus (USB) (registered trademark), a high-definition multimedia interface (HDMI) (registered trademark), or others may be used. Furthermore, the authentication device 102 and the imaging device 103 may perform near field wireless communication of a predetermined communication standard. This communication standard is arbitrary. For example, Bluetooth (registered trademark), ultra wide band (UWB), or Wi-Fi (registered trademark) may be used.

For example, the communication unit 151 may acquire information supplied from another device by the above-described communication and supply the information to any one or more of the issuance processing unit 152 to the confirmation unit 155. Furthermore, the communication unit 151 may acquire information supplied from any one or more of the issuance processing unit 152 to the confirmation unit 155, and supply the information to another device by the communication.

The issuance processing unit 152 performs processing related to issuance of the user information. That is, the issuance processing unit 152 can also be referred to as an issuance unit. For example, the issuance processing unit 152 may request the image management server 101 to issue the user information via the communication unit 151. Furthermore, the issuance processing unit 152 may acquire the user information supplied from the image management server 101 in response to the request via the communication unit 151. Furthermore, the issuance processing unit 152 may supply the user information to the storage unit 156 and store the user information in the storage unit.

The registration processing unit 153 performs processing related to registration of the authentication device 102. That is, the registration processing unit 153 can also be referred to as a registration unit. For example, the registration processing unit 153 may control the communication unit 151 to start a near field communication session with the imaging device 103. Furthermore, the registration processing unit 153 may acquire a device ID, which is identification information of the authentication device 102, from the storage unit 156. Furthermore, the registration processing unit 153 may request registration of the authentication device 102 by supplying the device ID to the imaging device 103 via the communication unit 151. Furthermore, the registration processing unit 153 may acquire a public key (also referred to as an authentication device public key) corresponding to a private key (also referred to as an authentication device private key) unique to the authentication device 102 from the storage unit 156. Furthermore, the registration processing unit 153 may supply the authentication device public key to the imaging device 103 via the communication unit 151. Furthermore, the registration processing unit 153 may acquire the user information from the storage unit 156. Furthermore, the registration processing unit 153 may supply the user information to the imaging device 103 via the communication unit 151. Note that the registration of the authentication device 102 may be performed by near field communication with the imaging device 103 or may be performed by communication via the network 110.

The user authentication processing unit 154 performs processing related to authentication (that is, authentication of the user (image contributor)) of the authentication device 102. That is, the user authentication processing unit 154 can also be referred to as an authentication unit. For example, the user authentication processing unit 154 may control the communication unit 151 to start a near field communication session with the imaging device 103. Furthermore, the user authentication processing unit 154 may acquire the device ID from the storage unit 156. Furthermore, the user authentication processing unit 154 may request authentication (that is, authentication of the user) of the authentication device 102 by supplying the device ID to the imaging device 103 via the communication unit 151.

Furthermore, the user authentication processing unit 154 may cause the imaging device 103 to authenticate the authentication device 102 by transmitting information encrypted using the authentication device private key to the imaging device 103 via the communication unit 151. For example, the user authentication processing unit 154 may acquire a random number supplied from the imaging device 103 in response to the above-described request via the communication unit 151. Furthermore, the user authentication processing unit 154 may generate an electronic signature (also referred to as an authentication device electronic signature) by hashing the random number and encrypting it using the authentication device private key. Furthermore, the user authentication processing unit 154 may supply the authentication device electronic signature to the imaging device 103 via the communication unit 151.

The confirmation unit 155 performs processing related to confirmation of a distance between the authentication device 102 and the imaging device 103. For example, the confirmation unit 155 may regularly or irregularly repeatedly confirm whether a distance to the imaging device 103 is closer than a predetermined threshold by using near field communication with the imaging device 103. Furthermore, in a case where it is determined that the distance is more than or equal to the threshold, the confirmation unit 155 may notify the imaging device 103 of the fact via the communication unit 151.

The storage unit 156 includes an arbitrary storage medium such as a hard disk or a semiconductor memory, and performs processing related to storage and reading of arbitrary information. For example, the storage unit 156 may store the device ID, the authentication device private key, and the authentication device public key in advance. Note that "in advance" indicates at least before the information is used. That is, the storage unit 156 may store these pieces of information, for example, at the time of shipment from the factory or after shipment from the factory. Furthermore, the storage unit 156 may acquire and store the user information supplied from the issuance processing unit 152. Note that the device ID is identification information of the authentication device 102, and the authentication device private key is a private key unique to the authentication device 102. The authentication device public key is a public key corresponding to the authentication device private key.

Furthermore, the storage unit 156 may read the device ID in response to a request from the registration processing unit 153 and supply the device ID to the registration processing unit 153. Furthermore, the storage unit 156 may read the authentication device public key in response to a request from the registration processing unit 153 and supply the authentication device public key to the registration processing unit 153. Furthermore, the storage unit 156 may read the user information in response to a request from the registration processing unit 153 and supply the user information to the registration processing unit 153.

Furthermore, the storage unit 156 may read the authentication device private key in response to a request from the user authentication processing unit 154 and supply the authentication device private key to the user authentication processing unit 154.

In the authentication device 102 having such a configuration, for example, the communication unit 151 performs communication (near field communication) with the imaging device 103, and the confirmation unit 155 regularly or irregularly repeatedly confirms whether the distance to the imaging device 103 is closer than a predetermined threshold using the communication with the imaging device 103. Then, in a case where it is determined that the distance is more than or equal to the threshold, the confirmation unit 155 notifies the imaging device 103 of the fact via the communication unit 151.

By doing so, the imaging device 103 can grasp whether the authentication device 102 is closer or farther than a predetermined distance (threshold) on the basis of the notification. As a result, the imaging device 103 can authenticate the authentication device 102 according to the distance to the authentication device 102. For example, in a case where the authentication device 102 is in proximity (that is, in a case where the distance between the imaging device 103 and the authentication device 102 is closer than the threshold), the imaging device 103 may authenticate the authentication device 102. Furthermore, in a case where the authentication device 102 is not in proximity (that is, in a case where the distance between the imaging device 103 and the authentication device 102 is more than or equal to the threshold), the imaging device 103 may not authenticate the authentication device 102.

With this configuration, when the authentication device 102 is separated from the imaging device 103 by a predetermined distance or more, the authentication of the authentication device 102 can be canceled. In other words, it can be provided that the authentication device 102 is authenticated only in a case where the authentication device 102 is in proximity to the imaging device 103. That is, only in this case, the user information provided by the authentication device 102 can be stored in the image file in the imaging device 103. Therefore, in a case where the image management server 101 determines that the user information stored in the image file is valid, it is ensured that the authentication device 102 used by the image contributor is in proximity to the imaging device 103. Therefore, the image management server 101 can more accurately specify the image contributor of the captured image stored in the image file.

Furthermore, the user authentication processing unit 154 transmits the device ID of the authentication device 102 and information (for example, an encrypted random number) encrypted using the authentication device private key to the imaging device 103 via the communication unit 151, thereby causing the imaging device 103 to authenticate the authentication device 102. Therefore, the imaging device 103 can authenticate the authentication device 102 more accurately. That is, it is possible to prevent a device different from the authentication device 102 from being authenticated as the authentication device 102.

<Imaging Device>

FIG. 4 is a block diagram illustrating a main configuration example of the imaging device 103 which is an aspect of an information processing device to which the present technology is applied. Note that, in FIG. 4, main processing units, data flows, and the like are illustrated, and those illustrated in FIG. 4 are not necessarily all. That is, the imaging device 103 may include a device or a processing unit not illustrated as a block in FIG. 4. Furthermore, there may be a flow of data or processing that is not illustrated as an arrow or the like in FIG. 4.

The imaging device 103 may be implemented by any configuration. For example, the imaging device 103 may be a dedicated device that captures a still image, such as a so-called camera. Furthermore, the imaging device 103 may be a device capable of capturing both a still image and a moving image, such as a so-called video camera. Furthermore, the imaging device 103 may be an information processing device having an imaging function, such as a so-called smartphone, a smart watch, a tablet terminal, a notebook personal computer, or the like. Furthermore, the imaging device 103 may include a single device or a plurality of devices.

As illustrated in FIG. 4, the imaging device 103 includes a communication unit 171, a registration unit 172, a user authentication unit 173, an imaging control unit 174, an image file generation unit 175, an upload unit 176, a storage unit 177, a UI unit 178, and an imaging unit 179.

The communication unit 171 performs processing related to communication with another device. For example, the communication unit 171 may communicate with the image management server 101 and the authentication device 102 via the network 110. Furthermore, the communication unit 171 may perform near field communication with the authentication device 102.

For example, the communication unit 171 may acquire information supplied from another device by such communication and supply the information to the registration unit 172 and the user authentication unit 173. Furthermore, the communication unit 171 may acquire information supplied from the registration unit 172, the user authentication unit 173, or the upload unit 176, and supply the information to another device by the communication.

The registration unit 172 performs processing related to registration of the authentication device 102 (user). For example, the registration unit 172 may control the communication unit 171 to start a near field communication session with the authentication device 102. Furthermore, the registration unit 172 may acquire the device ID transmitted from the authentication device 102 by the near field communication via the communication unit 171. The device ID is identification information of the authentication device 102, and means a registration request of the authentication device 102.

For example, the registration unit 172 may control the UI unit 178 to display a registration confirmation screen on a display or the like to confirm with the user whether or not to register the authentication device 102. Furthermore, in a case where the user permits the registration, the registration unit 172 may request the authentication device 102 to transmit the authentication device public key and the user information via the communication unit 171. Furthermore, the registration unit 172 may acquire the authentication device public key and the user information transmitted in response to the request via the communication unit 171.

Furthermore, the registration unit 172 may encrypt the acquired user information using a common key (also referred to as a camera common key) owned by the imaging device 103. Furthermore, the registration unit 172 may supply the device ID, the authentication device public key, and the encrypted user information to the storage unit 177 to store as information regarding the authentication device 102. That is, the authentication device 102 is registered by this processing.

The user authentication unit 173 performs processing related to authentication of the user. Since the user of the authentication device 102 and the user of the imaging device 103 are the same, for example, the user authentication unit 173 may authenticate the user by authenticating the authentication device 102. That is, the user authentication unit 173 can also be referred to as an authentication unit. For example, the user authentication unit 173 may control the communication unit 171 to start a near field communication session with the authentication device 102. Furthermore, the user authentication unit 173 may acquire the device ID transmitted from the authentication device 102 by the near field communication via the communication unit 171. The device ID is identification information of the authentication device 102, and means an authentication request (that is, an authentication request of the user) of the authentication device 102.

For example, the user authentication unit 173 may confirm whether the same device ID as the device ID exists in the information (also referred to as registration data) regarding the authentication device 102 stored in the storage unit 177. In a case where the device ID supplied from the authentication device 102 matches the device ID of the registration data, the user authentication unit 173 may determine that the authentication device 102 has been registered.

Furthermore, in a case where it is determined that the authentication device 102 that has requested authentication has been registered, the user authentication unit 173 may generate a random number and supply the random number to the authentication device 102 via the communication unit 171. Furthermore, the user authentication unit 173 may acquire the authentication device electronic signature transmitted from the authentication device 102 via the communication unit 171.

Furthermore, the user authentication unit 173 may acquire an authentication device public key (that is, the authentication device public key of the authentication device 102) corresponding to the device ID of the authentication device 102 in the registration data from the storage unit 177. Furthermore, the user authentication unit 173 may verify whether the authentication device private key owned by the authentication device 102 corresponds to the registered authentication device public key by using the authentication device public key and the authentication device electronic signature. For example, the user authentication unit 173 may perform this verification by comparing a result obtained by hashing the random number supplied to the authentication device 102 with a result obtained by decrypting the authentication device electronic signature using the authentication device public key. Furthermore, the user authentication unit 173 may determine that the authentication device private key and the authentication device public key correspond to each other in a case where the two match as a result of the comparison.

In a case where the device ID of the authentication device 102 has been registered, and the authentication device private key of the authentication device 102 corresponds to the registered authentication device public key, the user authentication unit 173 may determine that the authentication device 102 is a registered device, and authenticate the authentication device 102. That is, in this case, the user authentication unit 173 may authenticate that the user (image contributor) of the imaging device 103 is a registered valid user.

For example, in a case where the user is authenticated, the user authentication unit 173 may notify the imaging control unit 174 of the fact. At that time, the user authentication unit 173 may supply the device ID of the authenticated authentication device 102 to the imaging control unit 174.

Furthermore, in a case where the user is authenticated, the user authentication unit 173 may acquire, from the storage unit 177, user information (encrypted user information) corresponding to the device ID of the authentication device 102 in the registration data. Furthermore, the user authentication unit 173 may acquire the camera common key from the storage unit 177. Furthermore, the user authentication unit 173 may decrypt the encrypted user information using the camera common key. Furthermore, the user authentication unit 173 may supply the decrypted user information (user information corresponding to the authentication device 102) to the imaging control unit 174.

Furthermore, the user authentication unit 173 may regularly or irregularly repeatedly confirm the position of the authenticated authentication device 102. Then, the user authentication unit 173 may continue to authenticate the authentication device only in a state where the authentication device 102 is sufficiently close to the imaging device 103. In other words, in a case where a position of the authentication device 102 is sufficiently away from the imaging device 103, the user authentication unit 173 may cancel the authentication of the authentication device 102 (that is, the user).

In the confirmation of the position of the authentication device 102, the user authentication unit 173 confirms whether or not communication with the authentication device 102 is possible, and may determine that the authentication device 102 is not sufficiently close to the imaging device 103 (sufficiently separated from the imaging device 103) in a case where communication becomes impossible. Furthermore, the user authentication unit 173 may acquire a notification supplied from the authentication device 102 via the communication unit 171. This notification indicates that the distance between the authentication device 102 and the imaging device 103 is a predetermined threshold or more. Therefore, in the case of acquiring this notification, the user authentication unit 173 may determine that the authentication device 102 is not sufficiently close to the imaging device 103 (sufficiently away from the imaging device 103).

Furthermore, in a case where the authentication of the authentication device 102 (that is, the user) is canceled, the user authentication unit 173 may notify the imaging control unit 174 of the cancellation.

The imaging control unit 174 performs processing related to control of the imaging unit 179. For example, the imaging control unit 174 may acquire a notification supplied from the user authentication unit 173. This notification is a notification regarding authentication of the authentication device 102 (that is, the user). Furthermore, the imaging control unit 174 may set an operation mode of imaging in response to this notification. In other words, the imaging control unit 174 may switch the operation mode of imaging in response to this notification. For example, in a case where the authentication device 102 (that is, the user) is authenticated, the imaging control unit 174 may set the operation mode to a mode for adding the user information to the captured image (a mode for storing the captured image and the user information in the image file). Furthermore, in a case where the authentication of the authentication device 102 (that is, the user) is canceled, the imaging control unit 174 may set the operation mode to a mode in which the user information is not added to the captured image (mode in which the user information is not stored in the image file).

Furthermore, the imaging control unit 174 may acquire the device ID and the user information supplied from the user authentication unit 173. The device ID and the user information are information corresponding to the authenticated authentication device 102. Furthermore, the imaging control unit 174 may supply the user information to the image file generation unit 175.

Furthermore, the imaging control unit 174 may control the UI unit 178 to receive an instruction (operation) of the user. For example, the imaging control unit 174 may cause (the output device included in) the UI unit 178 to present information corresponding to the authenticated user on the basis of the device ID. This information is information regarding imaging, and may include information (highly useful for the user) for an authenticated user. That is, the information presented by the UI unit 178 may be different for each user. Furthermore, the imaging control unit 174 may cause (an input device included in) the UI unit 178 to accept an instruction (operation) corresponding to the authenticated user on the basis of the device ID. The instruction (operation) is an instruction (operation) related to imaging, and may include an instruction (operation) highly useful for the authenticated user. That is, the instruction (operation) received by the UI unit 178 may be different for each user. Then, the imaging control unit 174 may acquire information indicating a user's instruction (user's operation) received by the UI unit 178.

Furthermore, the imaging control unit 174 may control the imaging unit 179 according to the instruction (that is, the operation of the user) to capture an image of the subject.

The image file generation unit 175 performs processing related to generation of an image file that stores a captured image. That is, the image file generation unit 175 can also be referred to as a content information file generation unit. For example, the image file generation unit 175 may acquire the captured image supplied from the imaging unit 179. Furthermore, the image file generation unit 175 may acquire the user information supplied from the imaging control unit 174. Furthermore, the image file generation unit 175 may acquire a camera private key from the storage unit 177. Furthermore, the image file generation unit 175 may acquire the camera certificate from the storage unit 177.

For example, the image file generation unit 175 may generate an image file and store the captured image acquired from the imaging unit 179 in the image file. Furthermore, the image file generation unit 175 may store the user information acquired from the imaging control unit 174 in the image file. That is, the image file generation unit 175 may add the user information to the captured image. Furthermore, the image file generation unit 175 may generate the camera electronic signature using the captured image, the user information, and the camera private key. For example, the image file generation unit 175 may generate the camera electronic signature by hashing the captured image (and the user information in a case where the user information is added) and encrypting the captured image with the camera private key. Then, the image file generation unit 175 may store the camera electronic signature in the image file. That is, the image file generation unit 175 may add a camera electronic signature to the captured image. Furthermore, the image file generation unit 175 may store the camera certificate in the image file. That is, the image file generation unit 175 may add a camera certificate to the captured image.

The image file generation unit 175 may supply the generated image file to the upload unit 176 to supply to the image management server 101. Furthermore, the image file generation unit 175 may supply the generated image file to the storage unit 177 and store the image file in the storage unit.

The upload unit 176 performs processing related to the upload of the image file. For example, the upload unit 176 may acquire the image file supplied from the image file generation unit 175. Furthermore, the upload unit 176 may supply (upload) the image file to the image management server 101 via the communication unit 171.

The storage unit 177 includes an arbitrary storage medium such as a hard disk or a semiconductor memory, and performs processing related to storage and reading of arbitrary information. For example, the storage unit 177 may store the camera common key, the camera private key, and the camera certificate in advance. Note that "in advance" indicates at least before the information is used. That is, the storage unit 177 may store these pieces of information, for example, at the time of shipment from the factory or after shipment from the factory. Note that the camera common key is a common key owned by the imaging device 103. The camera private key is a private key unique to the imaging device 103. The camera certificate is a certificate for a camera private key. The camera certificate may include a camera public key. The camera public key is a public key corresponding to the camera private key.

Furthermore, the storage unit 177 may acquire the device ID, the authentication device public key, and the encrypted user information supplied from the registration unit 172, and store them as registration data (information regarding the authentication device 102). Furthermore, the storage unit 177 may read the registration data (device ID) in response to a request from the user authentication unit 173 and supply the registration data to the user authentication unit 173. Furthermore, the storage unit 177 may read the registration data (authentication device public key) in response to a request from the user authentication unit 173, and supply the registration data to the user authentication unit 173. Furthermore, the storage unit 177 may read the registration data (encrypted user information) in response to a request from the user authentication unit 173 and supply the registration data to the user authentication unit 173. Furthermore, the storage unit 177 may read the camera common key in response to a request from the user authentication unit 173 and supply the camera common key to the user authentication unit 173.

Furthermore, the storage unit 177 may read the camera private key in response to a request from the image file generation unit 175 and supply the camera private key to the image file generation unit 175. Furthermore, the storage unit 177 may read the camera certificate in response to a request from the image file generation unit 175 and supply the camera certificate to the image file generation unit 175. Furthermore, the storage unit 177 may acquire and store the image file supplied from the image file generation unit 175.

The UI unit 178 performs processing related to a user interface. For example, the UI unit 178 includes an output device that outputs an image and audio. The output device may be any device, and may include, for example, a display that displays an image, character information, or the like. The display may be any display. For example, the display may be a liquid crystal display (LCD), an organic electro luminescence display (OELD), a projector, or a device other than these. Furthermore, the output device may include, for example, a speaker that outputs audio. The number of output devices included in the UI unit 178 is arbitrary. Furthermore, the UI unit 178 includes an input device that receives a user operation. The input device may be any device, and may include, for example, a touch panel, a switch, a keyboard, a mouse, an image sensor, a microphone, or the like. The number of input devices included in the UI unit 178 is arbitrary.

The UI unit 178 is driven under the control of the imaging control unit 174. For example, the UI unit 178 may present information to the user via an output device. For example, the UI unit 178 may present information for the authenticated user to the user via the output device. Furthermore, the UI unit 178 may receive a user's operation (user's instruction) via the input device. For example, the UI unit 178 may receive an instruction (operation) corresponding to the authenticated user via the input device. Furthermore, the UI unit 178 may supply information indicating the received user's instruction (user's operation) to the imaging control unit 174.

The imaging unit 179 includes an optical system such as a lens and a diaphragm and an image sensor, and performs processing related to capturing an image of a subject using the optical system and the image sensor. For example, the imaging unit 179 may be driven under the control of the imaging control unit 174. This control is performed according to a user's instruction (user's operation). Furthermore, the imaging unit 179 may be manually operated by the user. That is, the imaging unit 179 is driven according to the operation of the user (image contributor). For example, the imaging unit 179 may drive an optical system or an image sensor to capture an image of a subject and generate the captured image. That is, the imaging unit 179 can also be referred to as a content information generation unit. Furthermore, the imaging unit 179 may supply the generated captured image to the image file generation unit 175.

In the imaging device 103 having such a configuration, for example, the user authentication unit 173 authenticates the authentication device 102 (the authentication device 102 used by the user) associated with the user (image contributor), the imaging unit 179 generates a captured image according to the operation of the user, and in a case where the authentication device 102 used by the user is authenticated, the image file generation unit 175 generates an image file that stores the captured image and the user information of the user. With this configuration, the image management server 101 that is the recipient of the image file can verify whether the image contributor of the captured image is valid on the basis of the information (user information) included in the image file. This user information is, for example, not information manually input in the imaging device 103, but information stored in an image file by authenticating the authentication device 102 associated with the user (image contributor). Therefore, this user information has higher reliability than manually input information. Therefore, the recipient of the image file can more accurately specify the image contributor of the captured image stored in the image file. In other words, the imaging device 103 can generate an image file that enables the recipient to more accurately identify the image contributor of the captured image.

Furthermore, for example, the registration unit 172 registers the device ID of the authentication device 102 and the authentication device public key (stores the device ID and the authentication device public key in the storage unit 177). Then, the user authentication unit 173 authenticates the authentication device 102 using the device identification information and the authentication device public key registered by the registration unit 172. In this case, since the imaging device 103 performs authentication using not only the device identification information but also the authentication device public key, the authentication of the authentication device 102 (that is, the image contributor) can be performed more accurately. That is, the imaging device 103 can further improve the reliability of the user information. In other words, the recipient of the image file can more accurately specify the image contributor of the captured image stored in the image file.

Furthermore, for example, the registration unit 172 further registers user information. Then, in a case where the authentication device 102 is authenticated, the image file generation unit 175 stores the user information registered by the registration unit 172 in the image file. In this case, since the imaging device 103 stores the user information registered in association with the authentication device 102 in the image file, the reliability of the user information stored in the image file can be further improved as compared with the case of manually inputting the user information. In other words, the recipient of the image file can more accurately specify the image contributor of the captured image stored in the image file.

Furthermore, for example, as described above, the user information includes the user ID and the user electronic signature. By doing so, the recipient of the image file can verify whether or not the user information has been tampered with using the user electronic signature. Therefore, the imaging device 103 can further improve the reliability of the user information stored in the image file. In other words, the recipient of the image file can more accurately specify the image contributor of the captured image stored in the image file.

Furthermore, for example, after authenticating the authentication device 102, the user authentication unit 173 regularly or irregularly repeatedly confirms that the authentication device 102 can communicate with the imaging device 103. Furthermore, after authenticating the authentication device 102, the user authentication unit 173 regularly or irregularly repeatedly confirms whether the authentication device 102 is located within a predetermined distance from the imaging device 103. With this configuration, the imaging device 103 can confirm whether the authentication device 102 used by the image contributor is located near the imaging device 103. In other words, the imaging device 103 can more accurately determine whether or not the authenticated user is operating the imaging device 103 (that is, whether or not the authenticated user is an image contributor). Therefore, the imaging device 103 can further improve the reliability of the user information stored in the image file. In other words, the recipient of the image file can more accurately specify the image contributor of the captured image stored in the image file.

Furthermore, for example, in a case where it is determined that the authentication device 102 cannot communicate with the imaging device 103 in the confirmation, the user authentication unit 173 cancels the authentication of the authentication device 102. Furthermore, for example, in a case where a notification indicating that the authentication device 102 is away from the imaging device 103 by a predetermined distance or more is received from the authentication device 102 in the confirmation, the user authentication unit 173 cancels the authentication of the authentication device 102. That is, for example, in a case where the authentication device 102 of the user is separated from the imaging device 103 due to a change of the image contributor or the like, the authentication (that is, authentication of the user) of the authentication device 102 is canceled. When the authentication is canceled, the user information is not stored in the image file (not added to the captured image). Therefore, the imaging device 103 can further improve the reliability of the user information stored in the image file. In other words, the recipient of the image file can more accurately specify the image contributor of the captured image stored in the image file.

Furthermore, for example, the image file generation unit 175 generates the camera electronic signature using the captured image, the user information, and the camera private key, and stores the camera electronic signature in the image file. By doing so, the recipient of the image file can detect tampering of the information stored in the image file.

Furthermore, for example, the image file generation unit 175 further stores the camera certificate in the image file. By doing so, the recipient of the image file can detect tampering of the information stored in the image file using the camera certificate stored in the image file. Therefore, the recipient of the image file can more accurately detect tampering of the information stored in the image file.

<Flow of Image Processing>

Figure 5:
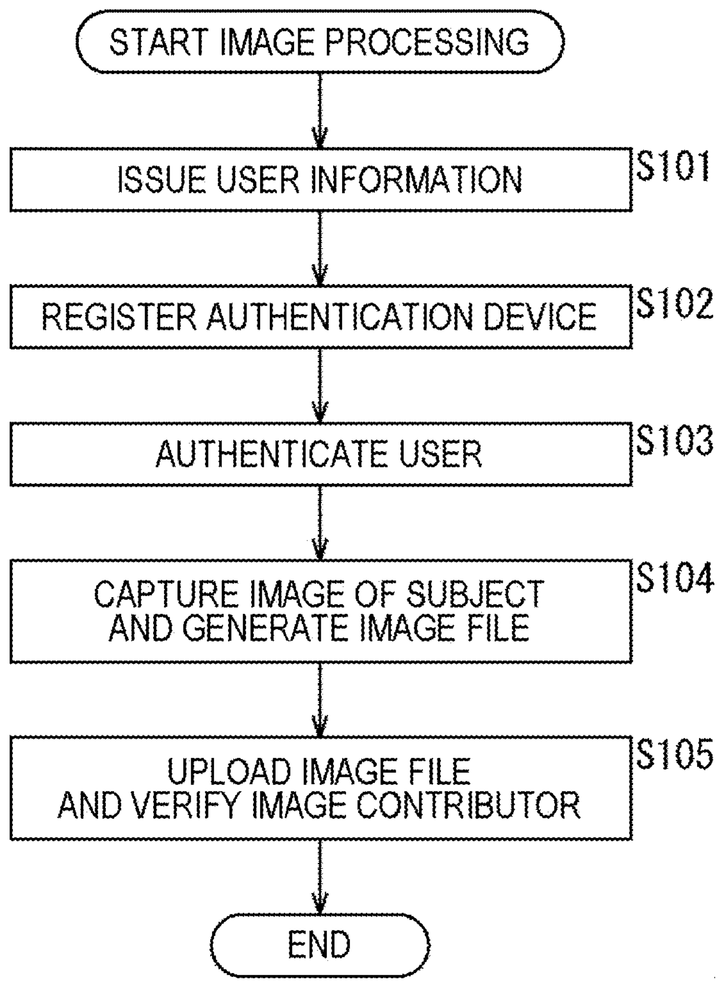
FIG. 5 is a flowchart explaining an example of a flow of image processing.

Next, an example of a flow of image processing executed by the image processing system 100 as described above will be described with reference to a flowchart of FIG. 5.

When the image processing is started, the image management server 101 and the authentication device 102 execute issuance processing of issuing the user information in step S101.

In step S102, the authentication device 102 and the imaging device 103 execute registration processing of registering the authentication device 102 in the imaging device 103.

In step S103, the authentication device 102 and the imaging device 103 execute authentication processing of authenticating the user (authentication device 102) and confirmation processing.

In step S104, the imaging device 103 executes imaging processing of capturing an image of a subject and generating an image file.

In step S105, the image management server 101 and the imaging device 103 execute verification processing of uploading the image file and verifying the image contributor.

When the processing of step S105 ends, the image processing ends.

<Flow of Issuance Processing>

Next, an example of a flow of the issuance processing executed in step S101 of FIG. 5 will be described with reference to a flowchart of FIG. 6.

When the issuance processing is started, the issuance processing unit 152 of the authentication device 102 requests the image management server 101 to issue the user information via the communication unit 151 in step S111.

In step S121, the user information issuance unit 132 of the image management server 101 acquires the request via the communication unit 131.

In step S122, the user information issuance unit 132 generates a user ID (that is, the user ID corresponding to the request source) in response to the request.

In step S123, the user information issuance unit 132 acquires the signature private key from the storage unit 134, and generates a user electronic signature using the generated user ID and the acquired signature private key. For example, the user information issuance unit 132 may generate the user electronic signature by hashing the user ID and encrypting the user ID with the signature private key.

Figure 7:
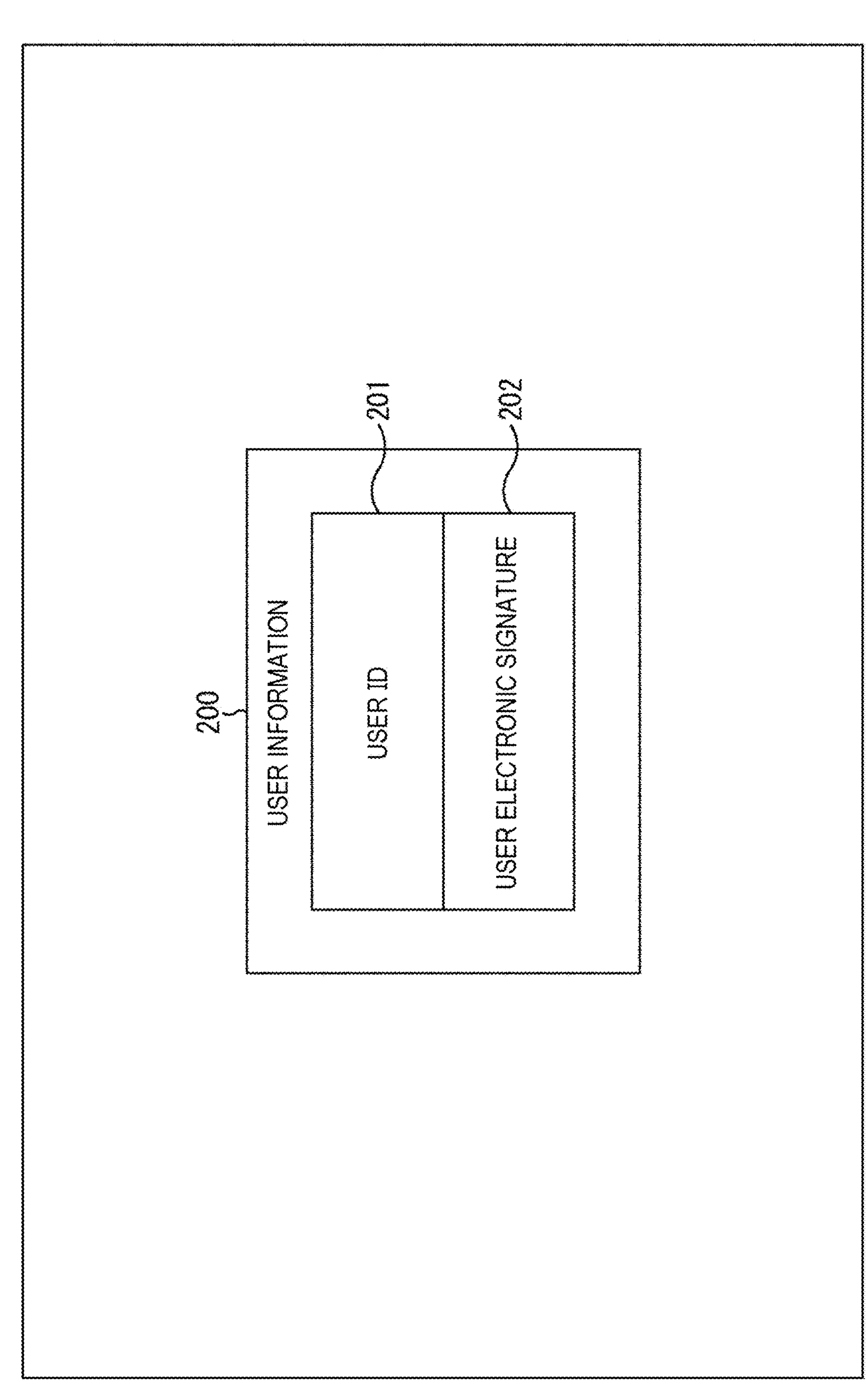
FIG. 7 is a diagram illustrating a main configuration example of user information.

In step S124, the user information issuance unit 132 generates user information including a user ID and a user electronic signature. FIG. 7 is a diagram illustrating a configuration example of the user information. In the case of the example of FIG. 7, user information 200 includes a user ID 201 and a user electronic signature 202. Of course, the user information 200 may include other information. That is, the user information issuance unit 132 generates user information corresponding to (the user of) the authentication device 102.

In step S125, the user information issuance unit 132 transmits the generated user information to the authentication device 102 via the communication unit 131. That is, the user information issuance unit 132 issues the requested user information.

In step S112, the issuance processing unit 152 of the authentication device 102 acquires the user information as a response corresponding to the request in step S111 via the communication unit 151.

In step S113, the issuance processing unit 152 supplies and stores the user information in the storage unit 134. The storage unit 134 stores the user information.

When the processing of step S113 ends, the issuance processing ends.

<Flow of Registration Processing>

Next, an example of a flow of the registration processing executed in step S102 of FIG. 5 will be described with reference to a flowchart of FIG. 8. After the issuance of the user information, when the authentication device 102 and the imaging device 103 perform near field communication for the first time, registration processing of registering information (user information and the like) regarding the authentication device 102 is executed.

When the registration processing is started, in step S141, the registration processing unit 153 of the authentication device 102 controls the communication unit 151 to start a near field communication session with the imaging device 103. The communication unit 151 performs near field communication with the imaging device 103 according to the control, and starts a session. On the other hand, in step S151, the registration unit 172 of the imaging device 103 controls the communication unit 171 to start a near field communication session with the authentication device 102. The communication unit 171 performs near field communication with the authentication device 102 according to the control and starts a session.

When the session is started, the registration processing unit 153 of the authentication device 102 acquires a device ID, which is identification information of the authentication device 102, from the storage unit 156 in step S142. Furthermore, the registration processing unit 153 supplies the device ID to the imaging device 103 via the communication unit 151 to request registration of the authentication device 102.

In step S152, the registration unit 172 of the imaging device 103 acquires the device ID (that is, a request for registration of the authentication device 102) transmitted from the authentication device 102 by the near field communication via the communication unit 171.

In step S153, the registration unit 172 controls the UI unit 178 to display a registration confirmation screen on the display or the like to confirm with the user whether or not to register the authentication device 102.

Figure 9:
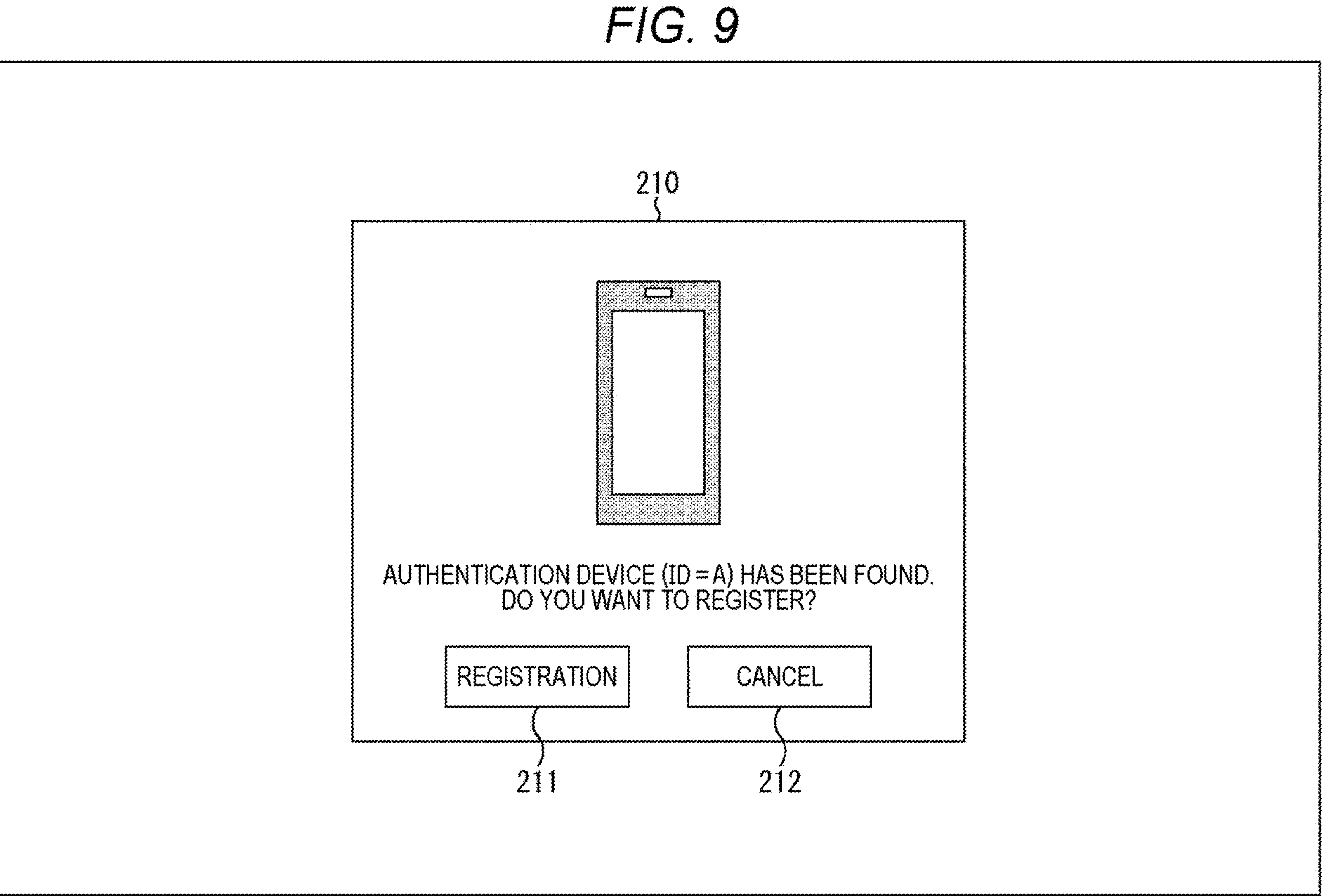
FIG. 9 is a diagram illustrating an example of a registration confirmation screen.

FIG. 9 is a diagram illustrating an example of a registration confirmation screen. In the case of the example of FIG. 9, a registration confirmation screen 210 displays a message "AUTHENTICATION DEVICE (ID=A) HAS BEEN FOUND. DO YOU WANT TO REGISTER?", a registration button 211, and a cancel button 212. The registration button 211 is a graphical user interface (GUI) to which an instruction to register the authentication device 102 (registration execution instruction) is input by the user's operation. The cancel button 212 is a GUI to which an instruction to cancel the registration of the authentication device 102 (registration cancel instruction) is input by the user's operation. The user who sees the above message operates the input device to press the registration button 211 or the cancel button 212. In a case where the registration button 211 is pressed, the registration processing is continued, and the following processing is executed. Furthermore, in a case where the cancel button 212 is pressed, the registration processing ends.

In a case where the registration button 211 is pressed and the registration of the authentication device 102 is permitted, the registration unit 172 requests the authentication device 102 to transmit the authentication device public key and the user information via the communication unit 171 in step S154. In step S143, the registration processing unit 153 of the authentication device 102 acquires the request via the communication unit 151.

In step S144, the registration processing unit 153 acquires the authentication device public key and the user information from the storage unit 156 in response to the request. Then, the registration processing unit 153 transmits the authentication device public key and the user information to the imaging device 103 via the communication unit 151 as a response to the request from the imaging device 103. In step S155, the registration unit 172 of the imaging device 103 acquires the authentication device public key and the user information transmitted from the authentication device 102 via the communication unit 171.

In step S156, the registration unit 172 acquires the camera common key from the storage unit 177. Then, the registration unit 172 encrypts the acquired user information with the camera common key.

In step S157, the registration unit 172 may supply the device ID, the authentication device public key, and the encrypted user information to the storage unit 177, and store the device ID, the authentication device public key, and the encrypted user information as information (registration data) regarding the authentication device 102. The storage unit 177 acquires the device ID, the authentication device public key, and the encrypted user information supplied from the registration unit 172, and stores the device ID, the authentication device public key, and the encrypted user information as information (registration data) regarding the authentication device 102. That is, the authentication device 102 is registered.

FIG. 10 is a diagram illustrating a main configuration example of registration data. In the case of the example of FIG. 10, the registration data 221 includes a device ID, an authentication device public key, and user information. Information acquired from the authentication device 102 is registered in each item. That is, in the registration data 221, the device ID of the authentication device 102, the authentication device public key, and the user information are registered in association with each other. As in the example of FIG. 10, encrypted user information may be registered in the item of the user information. Of course, plain text user information may be registered.

When the processing of step S157 ends, the registration processing ends.

<Flow of Authentication Processing>

Next, an example of a flow of the authentication processing executed in step S103 of FIG. 5 will be described with reference to a flowchart of FIG. 11. When the user operates the imaging device 103, authentication processing of authenticating the authentication device 102 used by the user (that is, authenticating the user) is performed.

When the authentication processing is started, in step S171, the user authentication processing unit 154 of the authentication device 102 controls the communication unit 151 to start a near field communication session with the imaging device 103. The communication unit 151 performs near field communication with the imaging device 103 according to the control, and starts a session. On the other hand, in step S181, the user authentication unit 173 of the imaging device 103 controls the communication unit 171 to start a near field communication session with the authentication device 102. The communication unit 171 performs near field communication with the authentication device 102 according to the control and starts a session.

When the session is started, the user authentication processing unit 154 of the authentication device 102 acquires the device ID from the storage unit 156 in step S172. Then, the user authentication processing unit 154 supplies the device ID to the imaging device 103 via the communication unit 151. By doing so, the user authentication processing unit 154 requests the imaging device 103 to authenticate the authentication device 102 (that is, authentication of the user). In step S182, the user authentication unit 173 of the imaging device 103 acquires the device ID transmitted from the authentication device 102 by the near field communication via the communication unit 171.

In step S183, the user authentication unit 173 confirms whether the same device ID as the device ID exists in the registration data stored in the storage unit 177. That is, the user authentication unit 173 acquires each device ID stored as the registration data from the storage unit 177, compares each device ID with the device ID supplied from the authentication device 102, and confirms whether there is a match. In a case where the device ID supplied from the authentication device 102 matches the device ID of the registration data, the user authentication unit 173 determines that the authentication device 102 has been registered. Furthermore, in a case where the device ID supplied from the authentication device 102 does not match the device ID of the registration data, the user authentication unit 173 determines that the authentication device 102 is unregistered, and the authentication processing ends without authenticating the authentication device 102.

In a case where it is determined that the authentication device 102 that has requested the authentication has been registered, the user authentication unit 173 generates a random number in step S184.

In step S185, the user authentication unit 173 transmits the random number to the authentication device 102 via the communication unit 171. In step S173, the user authentication processing unit 154 of the authentication device 102 acquires the random number supplied from the imaging device 103 via the communication unit 151.

In step S174, the user authentication processing unit 154 generates an authentication device electronic signature by hashing the random number and encrypting it using the authentication device private key.

In step S175, the user authentication processing unit 154 supplies the authentication device electronic signature to the imaging device 103 via the communication unit 151. In step S186, the user authentication unit 173 of the imaging device 103 acquires the authentication device electronic signature transmitted from the authentication device 102 via the communication unit 171.

In step S187, the user authentication unit 173 acquires the authentication device public key (that is, the authentication device public key of the authentication device 102) corresponding to the device ID of the authentication device 102 in the registration data from the storage unit 177. Then, the user authentication unit 173 verifies whether the authentication device private key owned by the authentication device 102 corresponds to the registered authentication device public key, using the authentication device public key and the authentication device electronic signature. For example, the user authentication unit 173 performs this verification by comparing a result obtained by hashing the random number supplied to the authentication device 102 with a result obtained by decrypting the authentication device electronic signature using the authentication device public key. Then, the user authentication unit 173 determines that the authentication device private key and the authentication device public key correspond to each other in a case where the two match as a result of the comparison.

In a case where the device ID of the authentication device 102 has been registered, and the authentication device private key of the authentication device 102 corresponds to the registered authentication device public key, the user authentication unit 173 determines that the authentication device 102 is a registered device, and authenticates the authentication device 102. That is, in this case, the user authentication unit 173 authenticates that the user (image contributor) of the imaging device 103 is a registered valid user.

For example, in a case where the user is authenticated, the user authentication unit 173 notifies the imaging control unit 174 of the fact. At that time, the user authentication unit 173 supplies the device ID of the authenticated authentication device 102 to the imaging control unit 174.

Furthermore, in a case where the user is authenticated, in step S188, the user authentication unit 173 acquires user information (encrypted user information) corresponding to the device ID of the authentication device 102 in the registration data from the storage unit 177. Furthermore, the user authentication unit 173 acquires the camera common key from the storage unit 177. Furthermore, the user authentication unit 173 decrypts the encrypted user information using the camera common key. Furthermore, the user authentication unit 173 supplies the decrypted user information (user information corresponding to the authentication device 102) to the imaging control unit 174.

In a case where the user is authenticated, in step S189, the imaging control unit 174 sets the operation mode of the imaging device 103 to the user information addition mode on the basis of the notification (switches from the mode in which the user information is not added to the mode in which the user information is added). The user information addition mode is a mode in which the user information is added to the captured image as metadata. That is, in the case of this mode, the captured image and the user information are stored in the image file.

When the processing of step S189 ends, the authentication processing ends.

<Flow of Confirmation Processing>

Figure 12:
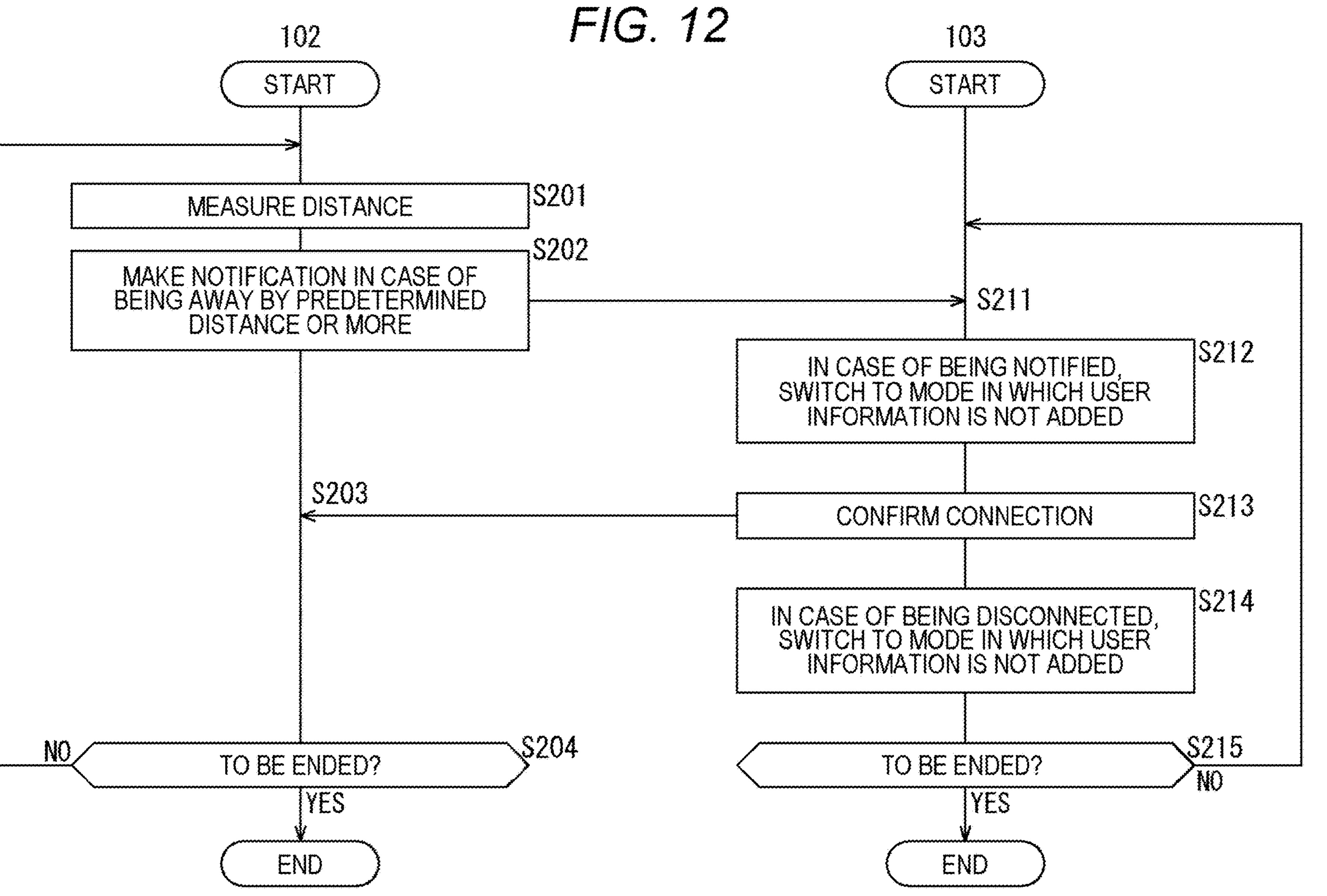
FIG. 12 is a flowchart explaining an example of a flow of confirmation processing.

Next, an example of a flow of the confirmation processing executed in step S103 of FIG. 5 will be described with reference to a flowchart of FIG. 12. After the authentication device 102 (that is, the user) is authenticated, confirmation processing of confirming whether or not the authentication device 102 is in proximity to the imaging device 103 is repeatedly executed regularly or irregularly.

When the confirmation processing is started, in step S201, the confirmation unit 155 of the authentication device 102 measures the distance to the imaging device 103 using near field communication with the imaging device 103.

In step S202, the confirmation unit 155 determines whether or not the measured distance is a predetermined threshold or more. As a result of the determination, in a case where it is determined that the authentication device 102 is away from the imaging device 103 by the predetermined distance or more, the confirmation unit 155 transmits a notification to that effect to the imaging device 103 via the communication unit 151. In step S211, the user authentication unit 173 of the imaging device 103 acquires the notification via the communication unit 171. In a case where this notification is acquired, the imaging control unit 174 determines that the authentication device 102 is not sufficiently close to the imaging device 103 (sufficiently away from the imaging device 103), and cancels the authentication of the authentication device 102 (that is, the user). In that case, in step S212, the imaging control unit 174 sets the operation mode of the imaging device 103 to a mode in which the user information is not added to the captured image (mode in which the user information is not stored in the image file). That is, the imaging control unit 174 switches the operation mode of the imaging device 103 from a mode in which the user information is added to the captured image to a mode in which the user information is not added to the captured image. Note that, in a case where the notification has not been received from the authentication device 102 in step S211, the processing of step S212 is omitted. In this case, the operation mode of the imaging device 103 remains the mode of adding the user information to the captured image.

Furthermore, in step S213, the user authentication unit 173 confirms connection of near field communication with the authentication device 102. In step S203, the communication unit 151 of the authentication device 102 performs processing corresponding to the connection confirmation.

In a case where it is determined in step S213 that the near field communication is disconnected (communication with the authentication device 102 is impossible), the imaging control unit 174 sets the operation mode of the imaging device 103 to a mode in which the user information is not added to the captured image (mode in which the user information is not stored in the image file) in step S214. That is, the imaging control unit 174 switches the operation mode of the imaging device 103 from a mode in which the user information is added to the captured image to a mode in which the user information is not added to the captured image. Note that, in a case where it is determined in step S213 that the near field communication is not disconnected (communication with the authentication device 102 is possible), the processing of step S214 is omitted. In this case, the operation mode of the imaging device 103 remains the mode of adding the user information to the captured image.

In step S204, the confirmation unit 155 of the authentication device 102 determines whether or not to end this verification processing. In a case where it is determined not to end the processing, the processing returns to step S201, and the subsequent processing is executed. That is, each processing of steps S201 to S204 is repeatedly executed until it is determined to end the confirmation processing. That is, the confirmation unit 155 regularly or irregularly repeatedly verifies whether the distance to the imaging device 103 is closer than a predetermined threshold by using near field communication with the imaging device 103.

Furthermore, in step S215, the user authentication unit 173 of the imaging device 103 determines whether or not to end this confirmation processing. In a case where it is determined not to end the processing, the processing returns to step S211, and the subsequent processing is executed. That is, each processing of steps S211 to S215 is repeatedly executed until it is determined to end the confirmation processing. That is, the user authentication unit 173 regularly or irregularly repeatedly confirms whether or not communication with the authentication device 102 is possible using near field communication with the authentication device 102.

Then, in a case where it is determined in step S204 or step S215 that the confirmation processing is to be ended, the confirmation processing is ended.

<Flow of Imaging Processing>

Next, an example of a flow of imaging processing executed in step S104 in FIG. 5 will be described with reference to a flowchart in FIG. 13.

When the imaging processing is started, in step S231, the imaging control unit 174 controls the imaging unit 179 on the basis of the instruction of the user received by the UI unit 178 to capture an image of the subject and generate the captured image. The imaging unit 179 captures an image of a subject and generates the captured image according to the control. The imaging unit 179 supplies the generated captured image to the image file generation unit 175.

In step S232, the image file generation unit 175 generates an image file that stores the captured image. The image file generation unit 175 stores the captured image in the generated image file.

In step S233, the image file generation unit 175 determines whether or not the operation mode of the imaging device 103 is a mode for adding the user information to the captured image. In a case where it is determined that the mode is a mode for adding the user information to the captured image, the processing proceeds to step S234.

In step S234, the image file generation unit 175 adds the user information of the user (image contributor) to the captured image. That is, the image file generation unit 175 adds the user information (the user information decrypted in step S188 in FIG. 11) corresponding to the device ID supplied from the authentication device 102 to the captured image. That is, the image file generation unit 175 stores the user information in the image file together with the captured image.

When the processing of step S234 ends, the processing proceeds to step S235. Furthermore, in a case where it is determined in step S233 that the operation mode of the imaging device 103 is a mode in which the user information is not added to the captured image, the processing of step S234 is omitted (skipped), and the processing proceeds to step S235.

In step S235, the image file generation unit 175 generates the camera electronic signature by using the captured image (in a case where metadata is added, the metadata (for example, user information)) and the camera private key. For example, in a case where the user information is added to the captured image, the image file generation unit 175 generates the camera electronic signature by hashing the captured image and the user information and encrypting them with the camera private key. Then, the image file generation unit 175 stores the camera electronic signature in the image file. That is, the image file generation unit 175 adds a camera electronic signature to the captured image.

In step S236, the image file generation unit 175 stores the camera certificate in the image file. That is, the image file generation unit 175 adds the camera certificate to the captured image.

When the processing of step S236 ends, the imaging processing ends.

Figure 14:
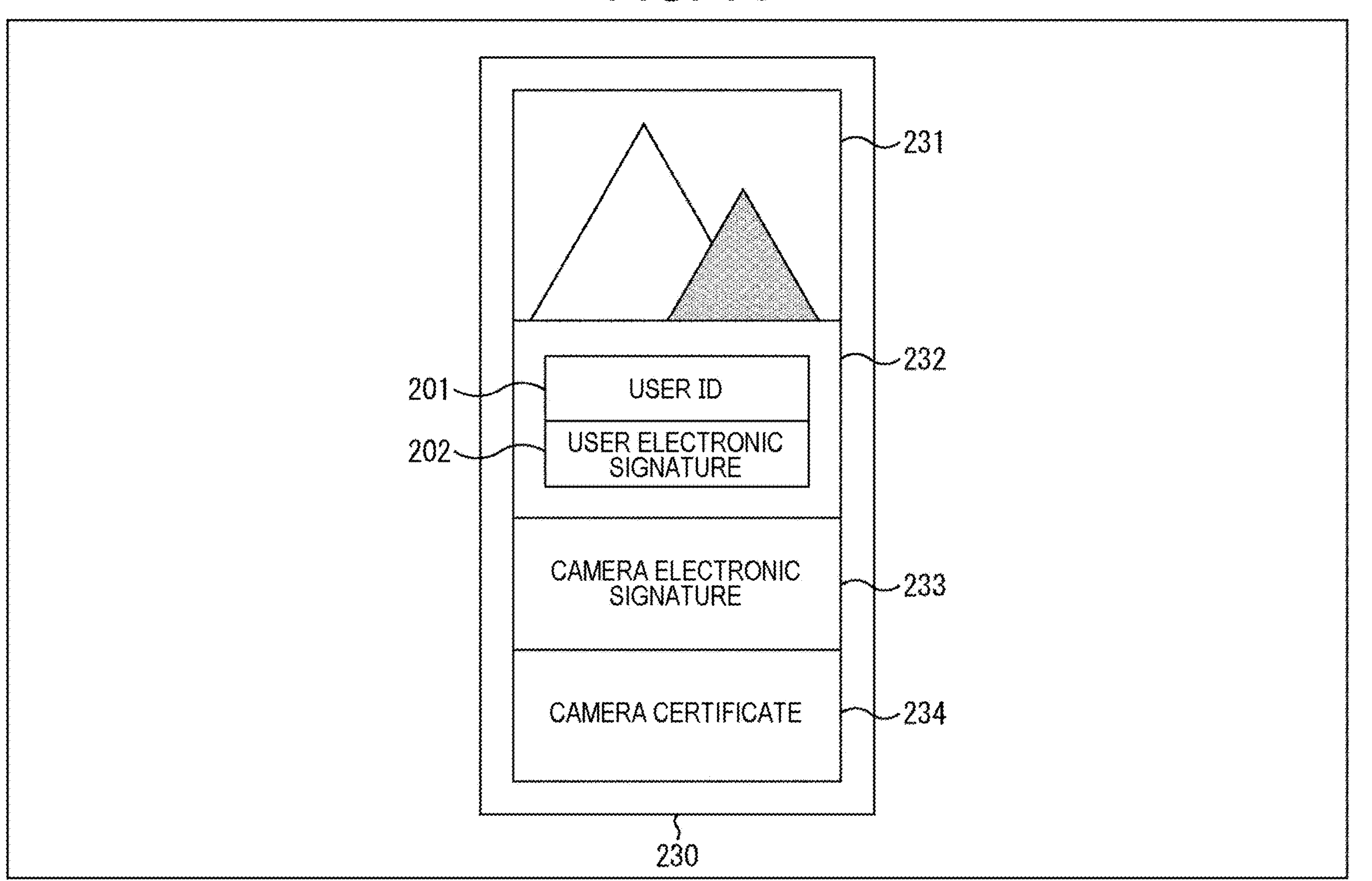
FIG. 14 is a diagram illustrating a main configuration example of an image file.

FIG. 14 is a diagram illustrating a main configuration example of an image file generated in a case where the authentication device 102 (that is, the user) is authenticated. That is, FIG. 14 illustrates a main configuration example of an image file generated in a case where the operation mode of the imaging device 103 is a mode of adding user information to a captured image. As illustrated in FIG. 14, in the image file 230 in this case, a captured image 231, user information 232, a camera electronic signature 233, and a camera certificate 234 are stored. Of course, information other than these may be stored in the image file 230.

The user information 232 includes a user ID 201 and a user electronic signature 202. FIG. 15 is a diagram illustrating an example of syntax regarding the user information 232 of the image file. Syntax 241 illustrated in FIG. 15 illustrates an example of syntax for adding a user ID 201. In a square frame 251 of the syntax 241, a user ID (In the example of FIG. 15, "did:sony:abcdefg") is stored as the credential information. Furthermore, syntax 242 illustrated in FIG. 15 illustrates an example of syntax for adding the user electronic signature 202. In a square frame 252 of the syntax 242, a user electronic signature (in the case of the example of FIG. 15, "eyJhbGciOiJSUzI1NiIsImI2NCI6ZmFsc2UsImNyaXQi OlsiYjY0Il19 . . . yHUdBBPMABCDD") corresponding to the above-described credential information (that is, a user ID) is stored.

Figure 16:
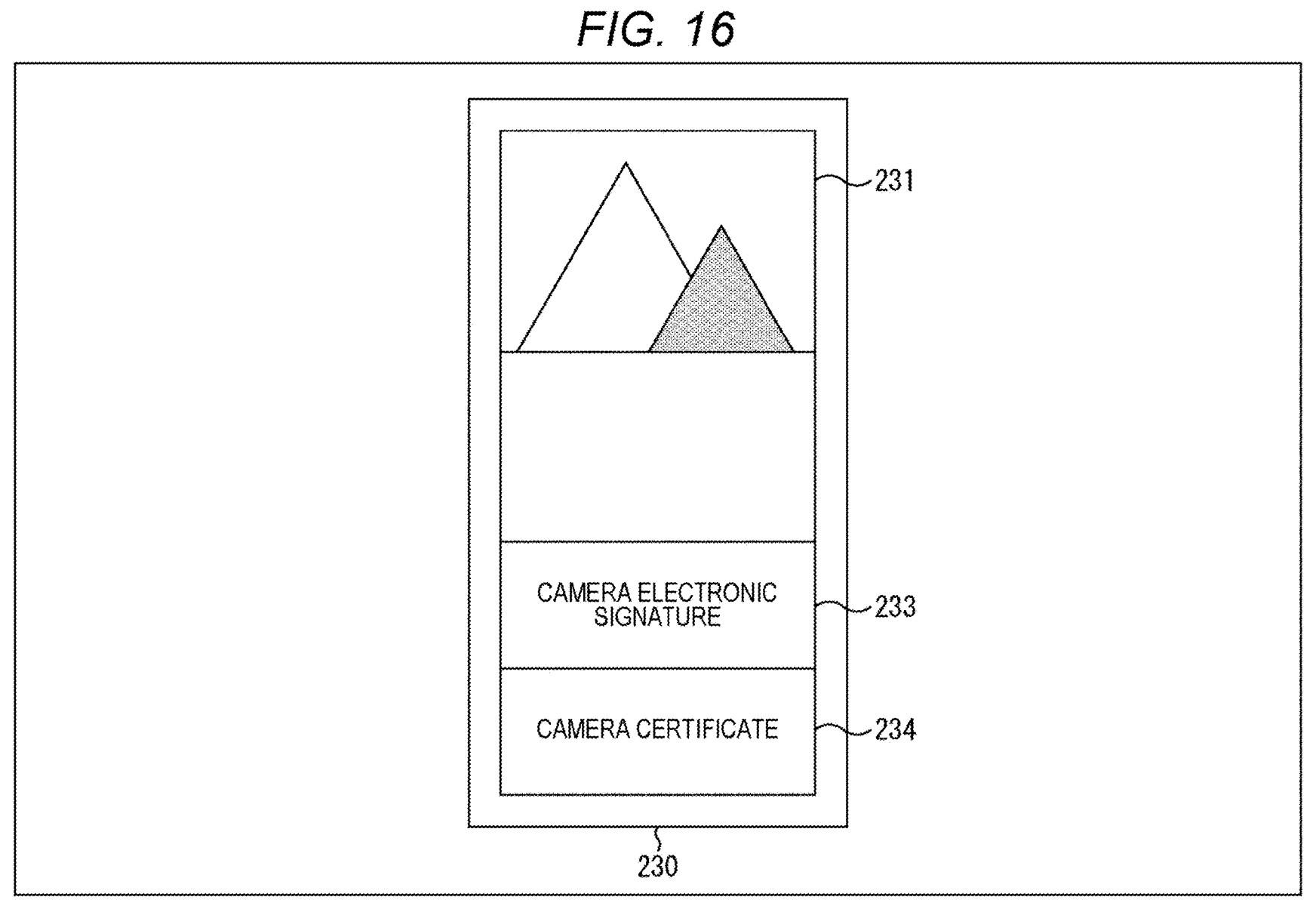

FIG. 16 is a diagram illustrating a main configuration example of an image file generated in a case where the authentication device 102 (that is, the user) is not authenticated. That is, FIG. 16 illustrates a main configuration example of the image file generated in a case where the operation mode of the imaging device 103 is a mode in which the user information is not added to the captured image. As illustrated in FIG. 16, a captured image 231, a camera electronic signature 233, and a camera certificate 234 are stored in the image file 230 in this case. That is, in this case, the user information 232 is not stored in the image file 230. Of course, information other than the captured image 231, the user information 232, the camera electronic signature 233, and the camera certificate 234 may be stored in the image file 230 in this case.

An image file having such a configuration is generated by the imaging process.

<Flow of Verification Processing>

Next, an example of a flow of the verification processing executed in step S105 of FIG. 5 will be described with reference to a flowchart of FIG. 17.

When the verification processing is started, in step S251, the upload unit 176 of the imaging device 103 transmits (uploads) the image file generated as described above to the image management server 101 via the communication unit 171. In step S261, the image contributor verification unit 133 of the image management server 101 acquires the image file via the communication unit 171. The image contributor verification unit 133 supplies and stores the image file in the storage unit 134.

In step S262, the image contributor verification unit 133 verifies whether the camera certificate stored in the image file is valid. This verification method is arbitrary. For example, the image contributor verification unit 133 may verify whether the camera certificate is valid by inquiring of a certificate authority in which information of the camera private key and the camera public key is registered.

In step S263, the image contributor verification unit 133 verifies whether or not the captured image and the metadata (user information and the like) stored in the image file have been tampered with, using the camera certificate and the camera electronic signature stored in the image file. For example, the image contributor verification unit 133 may perform this verification by comparing a hash of the captured image and the metadata (user information) with a decryption of the camera electronic signature with the camera public key.

In step S264, the image contributor verification unit 133 verifies whether the user ID included in the user information has been tampered with, using the signature certificate and the user electronic signature included in the user information. For example, the image contributor verification unit 133 may perform this verification by comparing a hash of the user ID with a decryption of the user electronic signature with the signature public key.

In step S265, the image contributor verification unit 133 may verify whether the user ID is valid. For example, the image contributor verification unit 133 may confirm whether the user ID exists in the user information generated by the user information issuance unit 132 and stored in the storage unit 134. That is, the image contributor verification unit 133 may confirm whether or not the user information is the user information issued by the user information issuance unit 132. Then, the image contributor verification unit 133 supplies information indicating a result of each verification as described above to the storage unit 134 and stores the information.

When the processing of step S265 ends, the verification processing ends.

By executing each processing as described above, in the image processing system 100, the image management server 101 that is a recipient of the image file generated by the imaging device 103 can more accurately specify the image contributor of the captured image stored in the image file. At that time, as described above, the image management server 101 can verify the image contributor using the user information obtained from the authentication device 102 used by the image contributor. Therefore, the image management server 101 can more accurately specify the information of the image contributor to be added to the captured image in the imaging device 103 than a case where the information is generated manually or the like.

Therefore, the image management server 101 can manage, for example, whether or not the information of the image contributor stored in the image file is valid. Furthermore, the image management server 101 can provide whether or not the information of the image contributor stored in the image file is valid to a provision destination of the image file. Furthermore, the image management server 101 can prevent (delete) an image file that stores invalid information.

4. Second Embodiment

<Biometric Authentication in Authentication Device>

In the image processing system 100 as described above, the authentication device 102 may authenticate the user using the biometric information. That is, the authentication device 102 may perform biometric authentication.

Figure 18:
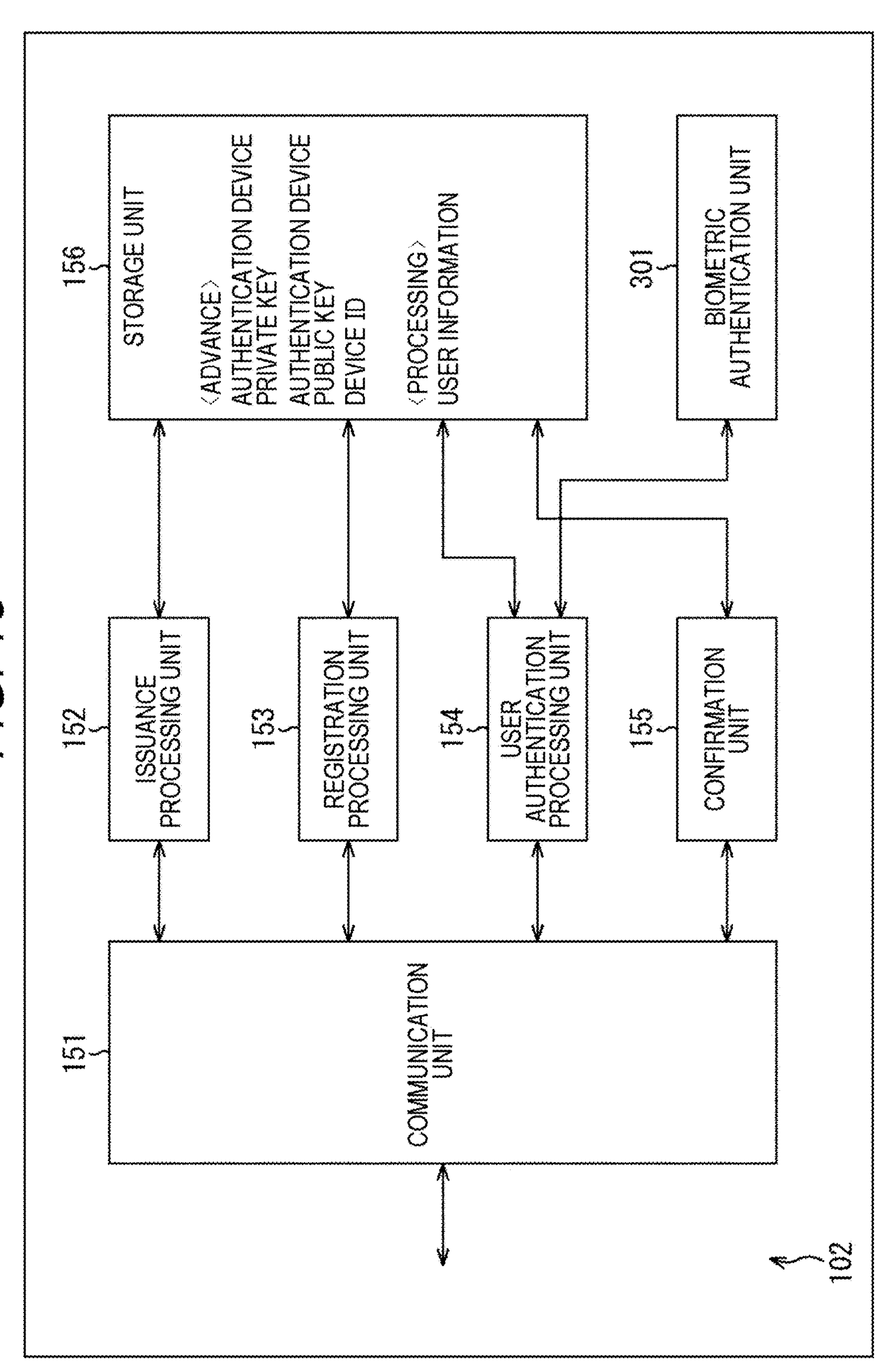
FIG. 18 is a block diagram illustrating a main configuration example of an authentication device.

FIG. 18 is a block diagram illustrating a main configuration example of the authentication device 102 in that case. As illustrated in FIG. 18, the authentication device 102 in this case includes a biometric authentication unit 301 in addition to the configurations illustrated in FIG. 3.

The biometric authentication unit 301 includes a sensor that detects predetermined biometric information, and performs processing related to reception of biometric information input by the user using the sensor. The biometric information necessary for authentication may be anything. For example, the information may be a fingerprint, a palm print, an iris, an eyeball blood vessel, a vein, a face, an auricle, a voiceprint, a posture, a gesture, or the like, or may be information other than these examples. Furthermore, a plurality of types of biological information may be combined and applied. The biometric authentication unit 301 is driven under the control of the user authentication processing unit 154. For example, the biometric authentication unit 301 may supply the biometric information of the user detected by the sensor to the user authentication processing unit 154.

The user authentication processing unit 154 may perform authentication (also referred to as biometric authentication) of the user by the biometric information when using the authentication device private key in the authentication processing. For example, the user authentication processing unit 154 may cause the biometric information of the user to be acquired via the biometric authentication unit 301. Furthermore, the user authentication processing unit 154 may compare the input biometric information with the biometric information of the user registered in advance, and may authenticate the user as a valid user in a case where both pieces of the biometric information match each other. Then, in a case where the user is authenticated, the user authentication processing unit 154 may permit the use of the authentication device private key. That is, in this case, the user authentication processing unit 154 may generate the authentication device electronic signature by using the random number and the authentication device private key. In other words, in a case where the user is not authenticated by the above-described biometric authentication, the user authentication processing unit 154 may not permit the use of the authentication device private key. That is, in this case, the user authentication processing unit 154 may omit (skip) the generation of the authentication device electronic signature.

That is, in a case where the biometric authentication is successful, the authentication processing is executed similarly to the case of the first embodiment, and in a case where the authentication of the authentication device 102 (user) is successful, the operation mode of the imaging device 103 is set to a mode for adding the user information to the captured image. On the other hand, in a case where the biometric authentication fails, since the authentication device electronic signature is not generated, the authentication of the authentication device 102 (user) fails, and the operation mode of the imaging device 103 is set to a mode in which the user information is not added to the captured image.

In such an authentication device 102, for example, the biometric authentication unit 301 authenticates the user using the biometric information of the user. Furthermore, in a case where the user is authenticated, the user authentication processing unit 154 encrypts information using the authentication device private key and transmits the encrypted information to the imaging device 103 via the communication unit 151.

By doing so, for example, it is possible to suppress an invalid user from operating the authentication device 102. Therefore, for example, in a case where the user loses the authentication device 102 and the imaging device 103, it is possible to prevent the third party who has obtained the authentication device 102 and the imaging device 103 from illegally operating the authentication device 102 and the imaging device 103 and illegally using the user information. As a result, the reliability of the user information can be improved. Therefore, the image management server 101 can more accurately specify the image contributor than a case where the imaging device 103 manually or the like generates the information of the image contributor to be added to the captured image.

<Flow of Authentication Processing>

Next, an example of a flow of the authentication processing in this case will be described with reference to a flowchart of FIG. 19.

When the authentication processing is started, the authentication device 102 executes each processing of steps S301 to S303 similarly to each processing of steps S171 to S173 of FIG. 11. Furthermore, the imaging device 103 executes each processing of steps S311 to S315 in a similar manner to each processing of steps S181 to S185 of FIG. 11.

In step S304, the user authentication processing unit 154 controls the biometric authentication unit 301 to perform biometric authentication of the user. For example, the biometric authentication unit 301 is controlled by the user authentication processing unit 154 to acquire biometric information of the user. The user authentication processing unit 154 acquires the biometric information and compares the biometric information with the biometric information of the user registered in advance. In a case where the two coincide with each other, the user authentication processing unit 154 determines that the user is a valid user and authenticates the user. In a case where the user is authenticated, the user authentication processing unit 154 permits use of the authentication device private key. On the other hand, in a case where the two do not match, the user authentication processing unit 154 determines that the user is an invalid user. In a case where the user is not authenticated, the user authentication processing unit 154 prohibits the use of the authentication device private key.

In a case where the user is authenticated in the authentication device 102 and use of the authentication device private key is permitted, the processing proceeds to step S305. Each processing in steps S305 and S306 is performed similarly to each processing in steps S174 and S175 in FIG. 11. Furthermore, in this case, in the imaging device 103, each processing of steps S316 to S319 is executed similarly to each processing of steps S186 to S189 of FIG. 11. That is, similarly to the case of the first embodiment, authentication of the user is performed in the imaging device 103.

Note that, in a case where the user is not authenticated in the authentication device 102 and the use of the authentication device private key is prohibited, the authentication processing ends.

By executing each processing in this manner, for example, it is possible to suppress an invalid user from operating the authentication device 102. Therefore, for example, in a case where the user loses the authentication device 102 and the imaging device 103, it is possible to prevent the third party who has obtained the authentication device 102 and the imaging device 103 from illegally operating the authentication device 102 and the imaging device 103 and illegally using the user information. As a result, the reliability of the user information can be improved. Therefore, the image management server 101 can more accurately specify the image contributor than a case where the imaging device 103 manually or the like generates the information of the image contributor to be added to the captured image.

<Biometric Authentication in Imaging Device>

In the image processing system 100 as described above, the imaging device 103 may authenticate the user using the biometric information. That is, the imaging device 103 may perform biometric authentication.

Figure 20:
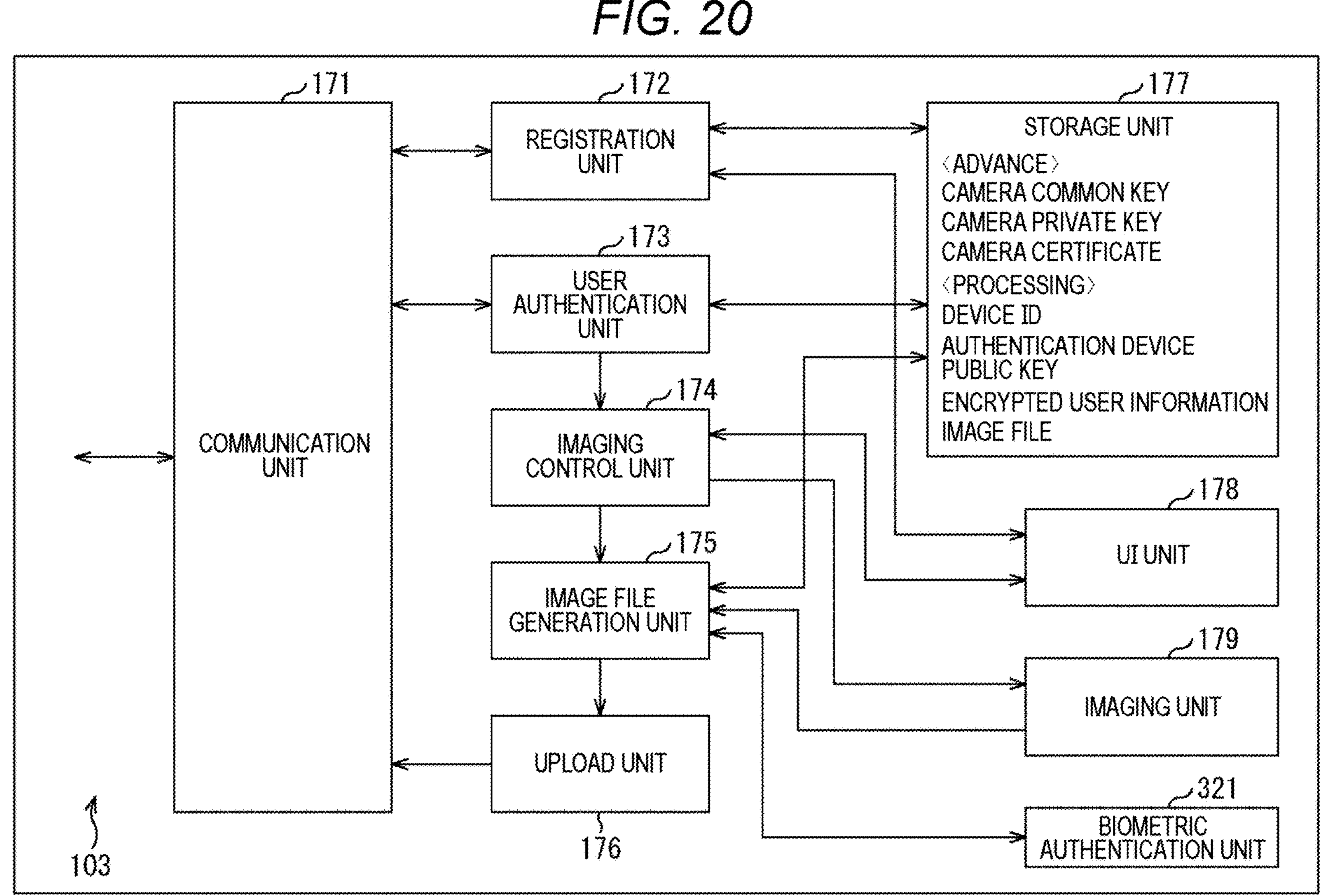
FIG. 20 is a block diagram illustrating a main configuration example of an imaging device.

FIG. 20 is a block diagram illustrating a main configuration example of the imaging device 103 in that case. As illustrated in FIG. 20, the imaging device 103 in this case includes a biometric authentication unit 321 in addition to the configuration illustrated in FIG. 4.

The biometric authentication unit 321 includes a sensor that detects predetermined biometric information, and performs processing related to reception of biometric information input by the user using the sensor. The biometric information necessary for authentication may be anything. For example, the information may be a fingerprint, a palm print, an iris, an eyeball blood vessel, a vein, a face, an auricle, a voiceprint, a posture, a gesture, or the like, or may be information other than these examples. Furthermore, a plurality of types of biological information may be combined and applied. The biometric authentication unit 321 is driven under the control of the image file generation unit 175. For example, the biometric authentication unit 321 may supply the image file generation unit 175 with the biometric information of the user detected by the sensor.

The image file generation unit 175 may perform authentication (also referred to as biometric authentication) of the user by the biometric information when using the camera private key in the imaging processing. For example, the image file generation unit 175 may cause the biometric information of the user to be acquired via the biometric authentication unit 321. Furthermore, the image file generation unit 175 may compare the input biometric information with the biometric information of the user registered in advance, and may authenticate the user as a valid user in a case where both pieces of the biometric information match each other. Then, in a case where the user is authenticated, the image file generation unit 175 may permit the use of the camera private key. That is, in this case, the image file generation unit 175 may generate the camera electronic signature using the captured image, the metadata (user information or the like), and the camera private key. In other words, in a case where the user is not authenticated by the above-described biometric authentication, the image file generation unit 175 may not permit the use of the camera private key. That is, in this case, the image file generation unit 175 may omit (skip) the generation of the camera electronic signature (or the user information).

That is, in a case where the biometric authentication is successful, the imaging processing is executed similarly to the case of the first embodiment. On the other hand, in a case where the biometric authentication fails, the camera electronic signature is not stored in the image file.

By doing so, for example, it is possible to suppress an invalid user from operating the imaging device 103. Therefore, for example, in a case where the user loses the authentication device 102 and the imaging device 103, it is possible to prevent the third party who has obtained the authentication device 102 and the imaging device 103 from illegally operating the authentication device 102 and the imaging device 103 and illegally using the user information. As a result, the reliability of the user information can be improved. Therefore, the image management server 101 can more accurately specify the image contributor than a case where the imaging device 103 manually or the like generates the information of the image contributor to be added to the captured image.

<Flow of Imaging Processing>

Figure 21:
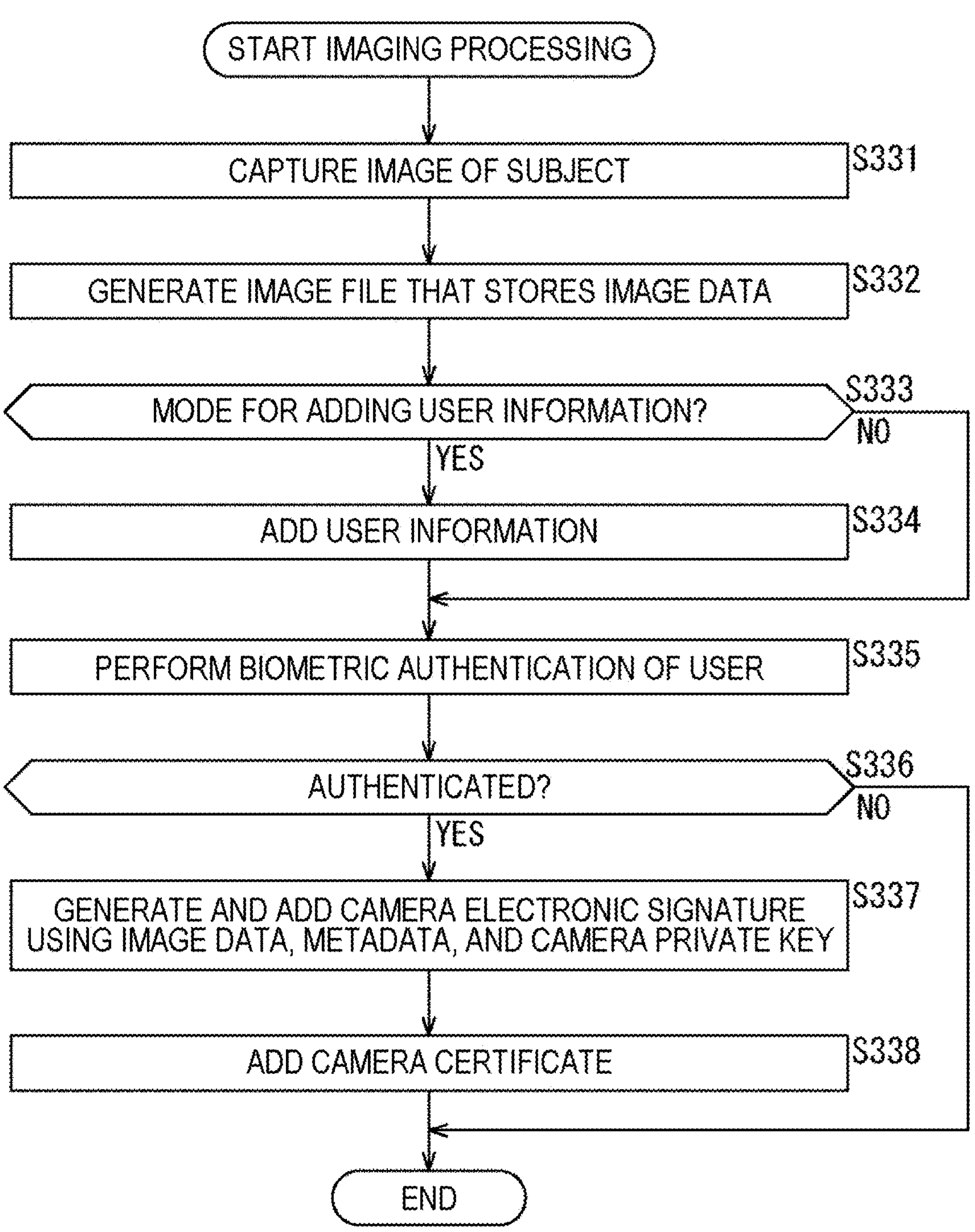
FIG. 21 is a flowchart explaining an example of a flow of imaging processing.

Next, an example of a flow of imaging processing in this case will be described with reference to a flowchart of FIG. 21.

Figure 13:
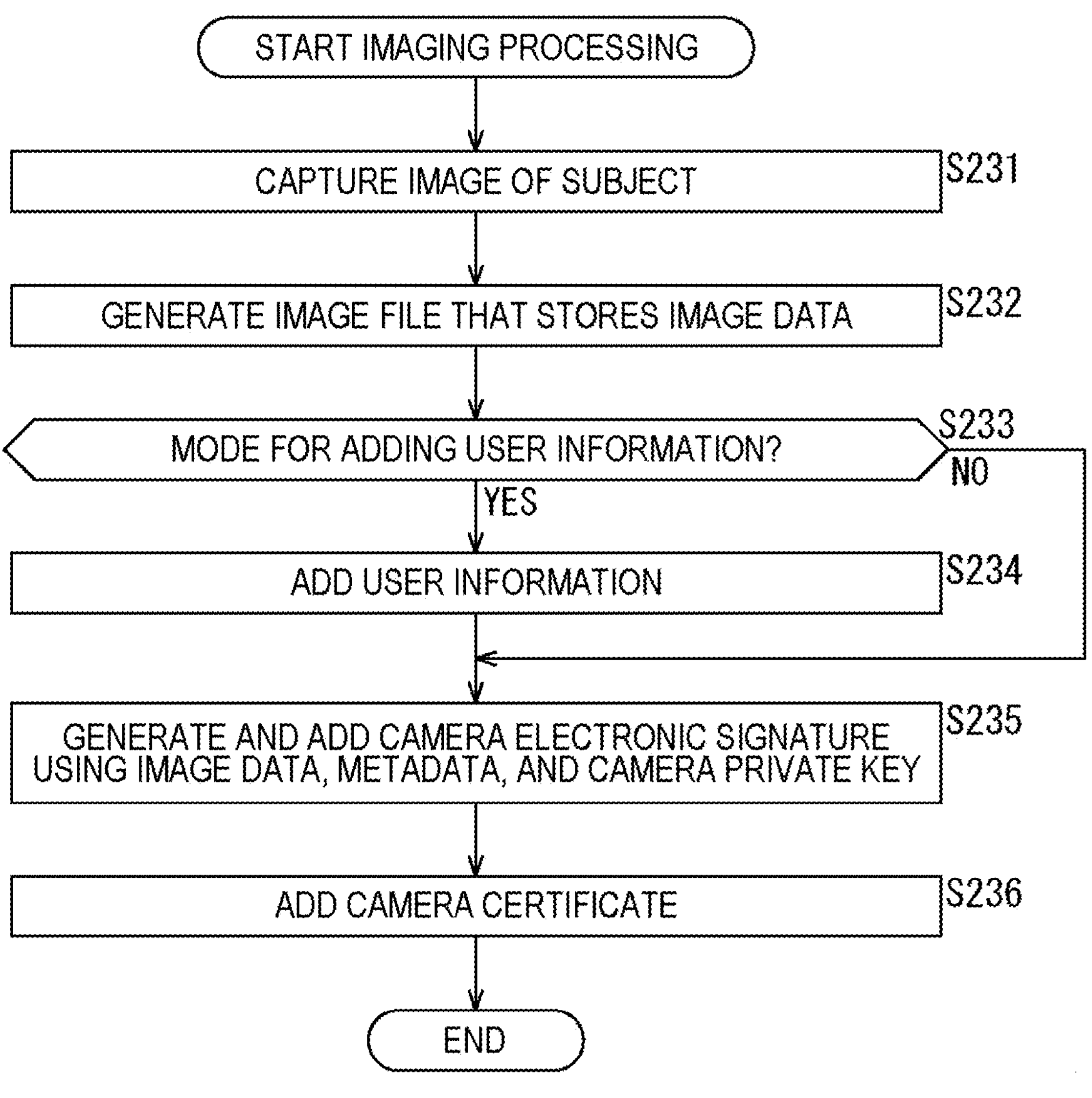
FIG. 13 is a flowchart explaining an example of a flow of imaging processing.

When the imaging processing is started, each processing of steps S331 to S334 is executed similarly to each processing of steps S231 to S234 of FIG. 13.

In step S335, the image file generation unit 175 controls the biometric authentication unit 321 to perform biometric authentication of the user. For example, the biometric authentication unit 321 is controlled by the image file generation unit 175 to acquire the biometric information of the user. The image file generation unit 175 acquires the biometric information and compares the biometric information with the biometric information of the user registered in advance. In a case where the two coincide with each other, the image file generation unit 175 determines that the user is a valid user and authenticates the user. In a case where the user is authenticated, the image file generation unit 175 permits use of the camera private key. On the other hand, in a case where the two do not match, the image file generation unit 175 determines that the user is an invalid user. In a case where the user is not authenticated, the image file generation unit 175 prohibits the use of the authentication device private key.

In step S336, the image file generation unit 175 determines whether or not the user is authenticated by the biometric authentication as described above. In a case where it is determined that the user is authenticated, the processing proceeds to step S337. Each processing in steps S337 and S338 are performed similarly to each processing in steps S235 and S236 in FIG. 13. That is, similarly to the case of the first embodiment, an image file is generated. When the processing of step S338 ends, the imaging processing ends.

Furthermore, after step S336, in a case where it is determined that the user is not authenticated by the biometric authentication, the imaging processing ends.

By executing each processing in this manner, for example, it is possible to suppress an invalid user from operating the imaging device 103. Therefore, for example, in a case where the user loses the authentication device 102 and the imaging device 103, it is possible to prevent the third party who has obtained the authentication device 102 and the imaging device 103 from illegally operating the authentication device 102 and the imaging device 103 and illegally using the user information. As a result, the reliability of the user information can be improved. Therefore, the image management server 101 can more accurately specify the image contributor than a case where the imaging device 103 manually or the like generates the information of the image contributor to be added to the captured image.

5. Third Embodiment

<Provision of User Information at the Time of Authentication>

In the first embodiment, it has been described that the user information included in the authentication device 102 is supplied to the imaging device 103 when the information (device ID or the like) regarding the authentication device 102 is registered in the imaging device 103. However, the method of providing the user information is not limited to this example. For example, when the information regarding the authentication device 102 is registered in the imaging device 103, the authentication device 102 may not provide the user information. For example, when the imaging device 103 authenticates the authentication device 102 by the authentication processing, the authentication device 102 may provide the user information.

For example, in the authentication processing, the user authentication unit 173 of the imaging device 103 acquires the user information supplied from the authentication device 102 via the communication unit 151. Then, the image file generation unit 175 stores the user information in the image file in the imaging processing.

With this configuration, in a case where the user loses the imaging device 103, it is possible to prevent the third party who has found the imaging device 103 from illegally operating the imaging device 103 and illegally using the user information. As a result, the reliability of the user information can be improved. Therefore, the image management server 101 can more accurately specify the image contributor than a case where the imaging device 103 manually or the like generates the information of the image contributor to be added to the captured image.

<Flow of Registration Processing>

An example of a flow of the registration processing in this case will be described with reference to a flowchart of FIG. 22. In this case, the authentication device 102 executes each processing of step S401 and step S402 in FIG. 22 in a similar manner to each processing of step S141 and step S142 in FIG. 8. Furthermore, the imaging device 103 executes each processing of steps S411 to S413 of FIG. 22 in a similar manner to each processing of steps S151 to S153 of FIG. 8.

In step S414 of FIG. 22, the registration unit 172 of the imaging device 103 requests the authentication device 102 to transmit the authentication device public key via the communication unit 171. In step S403, the registration processing unit 153 of the authentication device 102 acquires the request via the communication unit 151.

In step S404, the registration processing unit 153 acquires the authentication device public key from the storage unit 156 in response to the request. Then, the registration processing unit 153 transmits the authentication device public key to the imaging device 103 via the communication unit 151 as a response to the request from the imaging device 103. In step S415, the registration unit 172 of the imaging device 103 acquires the authentication device public key transmitted from the authentication device 102 via the communication unit 171.

In step S416, the registration unit 172 supplies the device ID and the authentication device public key to the storage unit 177, and stores the device ID and the authentication device public key as information (registration data) regarding the authentication device 102. The storage unit 177 acquires the device ID and the authentication device public key supplied from the registration unit 172, and stores the device ID and the authentication device public key as information (registration data) regarding the authentication device 102. That is, the authentication device 102 is registered. When the processing of step S416 ends, the registration processing ends.

Figure 23:
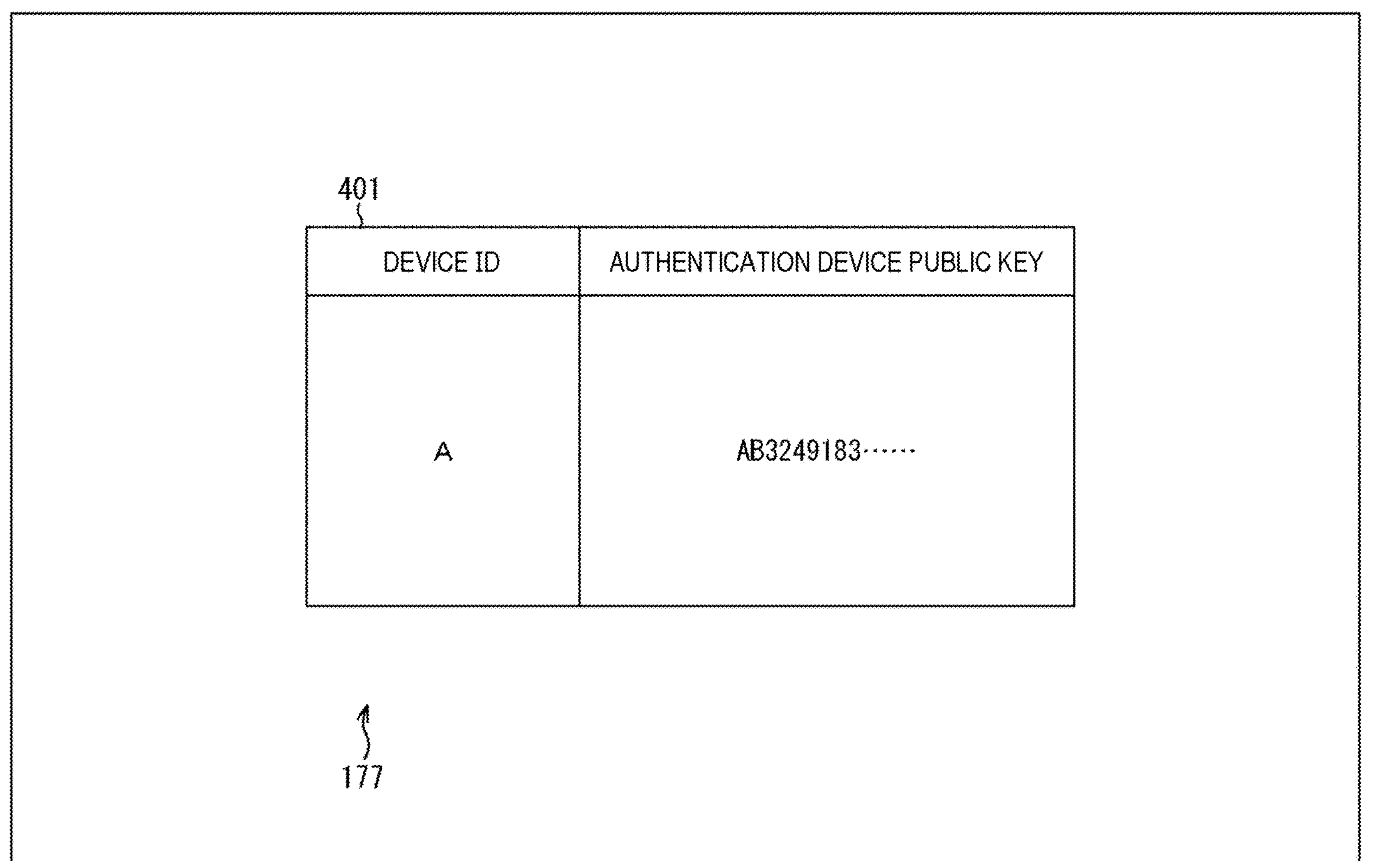
FIG. 23 is a diagram illustrating a main configuration example of registration data.

FIG. 23 is a diagram illustrating a main configuration example of registration data in this case. In the case of the example of FIG. 23, the registration data 401 includes a device ID and an authentication device public key. Information acquired from the authentication device 102 is registered in each item. That is, in the registration data 401, the device ID of the authentication device 102 and the authentication device public key are registered in association with each other. That is, in this case, the user information is not included (not registered) in the registration data.

<Flow of Authentication Processing>

An example of a flow of the registration processing in this case will be described with reference to a flowchart of FIG. 24. In this case, the authentication device 102 executes each processing of steps S431 to S434 of FIG. 24 similarly to each processing of steps S171 to S174 of FIG. 11. Furthermore, the imaging device 103 executes each processing of steps S441 to S445 of FIG. 24 in a similar manner to each processing of steps S181 to S185 of FIG. 8.

In step S435 of FIG. 24, the user authentication processing unit 154 of the authentication device 102 acquires the user information from the storage unit 156. Then, the user authentication processing unit 154 transmits the user information and the authentication device electronic signature generated in step S434 to the imaging device 103 via the communication unit 151. In step S446, the user authentication unit 173 of the imaging device 103 acquires the authentication device electronic signature and the user information transmitted from the authentication device 102 via the communication unit 171.

When the processing in step S446 ends, each processing in steps S447 and S448 are performed similarly to each processing in steps S187 and S189 in FIG. 11. When the processing of step S448 ends, the authentication processing ends. That is, in this case, in the authentication processing, the user information is provided from the authentication device 102 to the imaging device 103.

By executing each processing in this manner, it is possible to reduce the period during which the imaging device 103 possesses the user information as compared with the case of other embodiments. Therefore, for example, in a case where the user loses the imaging device 103, it is possible to prevent the third party who has found the imaging device 103 from illegally operating the imaging device 103 and illegally using the user information. As a result, the reliability of the user information can be improved. Therefore, the image management server 101 can more accurately specify the image contributor than a case where the imaging device 103 manually or the like generates the information of the image contributor to be added to the captured image.

6. Supplementary Note

<Application Example of Content Information and the Like>

Although the case where the content information is a captured image (still image) and the content information file is an image file has been described above as an example, the content information processed by the information processing device to which the present technology is applied is arbitrary and is not limited to the above example. For example, the content information may be a moving image. Furthermore, the content information may be, for example, a character, audio, or the like other than an image. That is, the content information file is also arbitrary, and may be other than the image file. Furthermore, the content information may be a combination of a plurality of types of content information such as an image and audio. That is, the creator of the content information may be other than the image contributor. Furthermore, the content information generation device may be a device other than the imaging device.

<Computer>

The above-described series of processing can be executed by hardware or software. In a case where a series of processing is executed by software, a program included in the software is installed on a computer. Here, the computer includes a computer incorporated in dedicated hardware, a general-purpose personal computer capable of executing various functions by installing various programs, and the like, for example.

Figure 25:
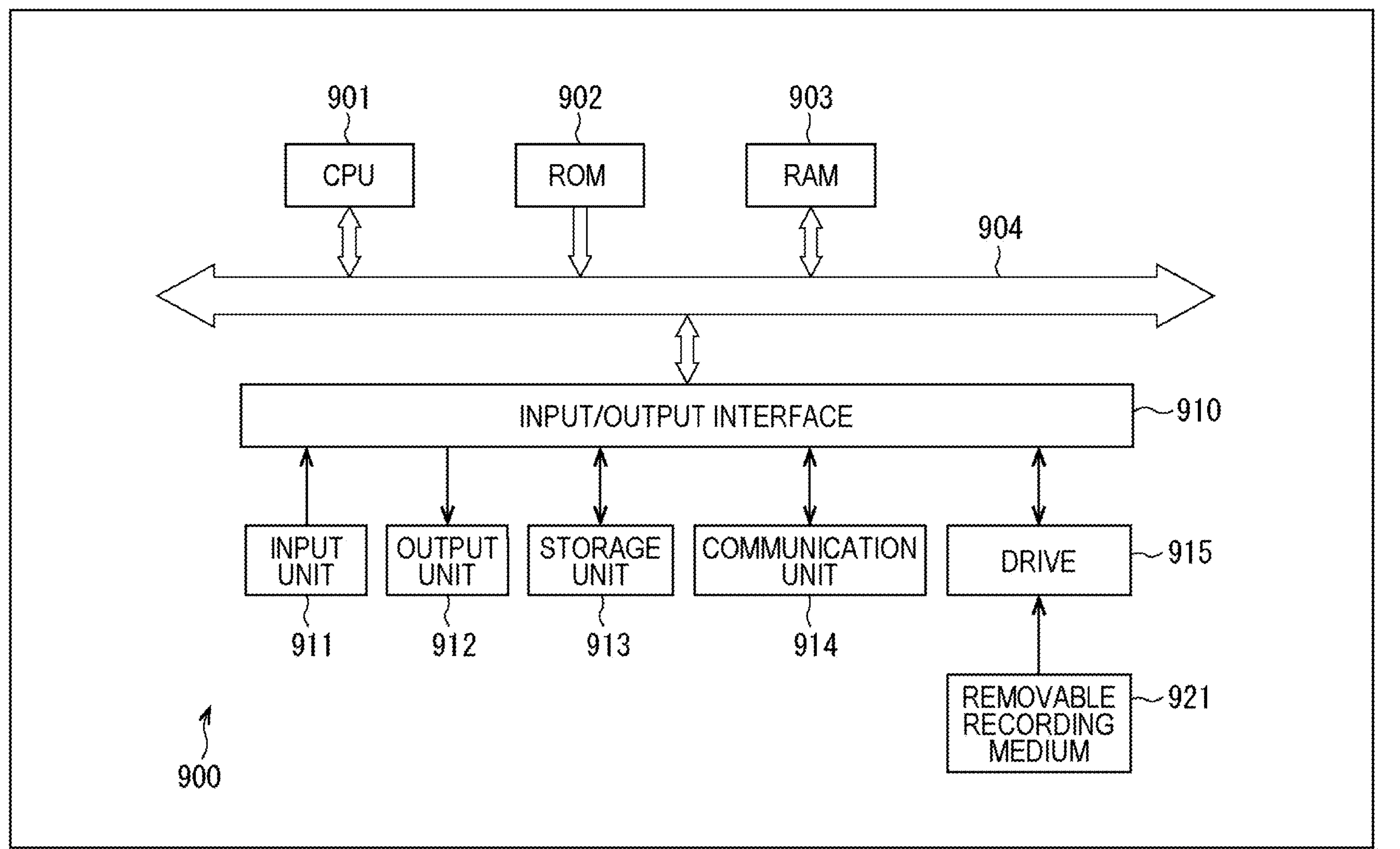
FIG. 25 is a block diagram illustrating a main configuration example of a computer.

FIG. 25 is a block diagram illustrating a configuration example of the hardware of the computer that executes the above-described series of processing by a program.

In a computer 900 illustrated in FIG. 25, a central processing unit (CPU) 901, a read only memory (ROM) 902, and a random access memory (RAN) 903 are mutually connected via a bus 904.

Furthermore, an input/output interface 910 is also connected to the bus 904. An input unit 911, an output unit 912, a storage unit 913, a communication unit 914, and a drive 915 are connected to the input/output interface 910.

The input unit 911 includes, for example, a keyboard, a mouse, a microphone, a touch panel, an input terminal, and the like. The output unit 912 includes, for example, a display, a speaker, an output terminal, and the like. The storage unit 913 includes, for example, a hard disk, a RAM disk, a non-volatile memory and the like. The communication unit 914 includes, for example, a network interface. The drive 915 drives a removable recording medium 921 such as a magnetic disk, an optical disk, a magneto-optical disk, or a semiconductor memory.

In the computer configured as described above, for example, the CPU 901 loads a program stored in the storage unit 913 into the RAM 903 via the input/output interface 910 and the bus 904 and executes the program. As a result, the series of processes described above is performed. The RAM 903 may appropriately store data and the like necessary for the CPU 901 to execute various processes.

The program executed by the computer may be recorded in the removable recording medium 921 as a package medium or the like and applied, for example. In that case, the program may be read from the removable recording medium 921 attached to the drive 915 and installed in the storage unit 913 via the input/output interface 910.

Furthermore, this program may be provided via any wired or wireless transmission medium such as a local area network, the Internet, digital satellite broadcasting, or the like. In this case, the program may be received by the communication unit 914 and installed in the storage unit 913 via the input/output interface 910.

In addition, the program may be installed in the ROM 902, the storage unit 913, or both in advance.

<Applicable Target of Present Technology>

The present technology may be applied to any configuration. For example, the present technology may be applied to various electronic devices.

Furthermore, for example, the present technology can also be implemented as a partial configuration of a device, such as a processor (for example, a video processor) as a system large scale integration (LSI) or the like, a module (for example, a video module) using a plurality of the processors or the like, a unit (for example, a video unit) using a plurality of the modules or the like, or a set (for example, a video set) obtained by further adding other functions to the unit.

Note that, in the present specification, a system means a set of a plurality of components (devices, modules (parts) and the like), and it does not matter whether or not all the components are in the same housing. Therefore, a plurality of devices stored in different housings and connected via a network and one device in which a plurality of modules is stored in one housing are both systems.

Field and Application to which Present Technology is Applicable

The system, device, processing unit and the like to which the present technology is applied can be used in any field such as traffic, medical care, crime prevention, agriculture, livestock industry, mining, beauty care, factory, household appliance, weather, and natural surveillance, for example. Furthermore, application thereof is also arbitrary.

<Others>

An embodiment of the present technology is not limited to the embodiment described above, and various modifications can be made without departing from the scope of the present technology.

For example, a configuration described as one device (or processing unit) may be divided and configured as a plurality of devices (or processing units). Conversely, configurations described above as a plurality of devices (or processing units) may be collectively configured as one device (or processing unit). Furthermore, it goes without saying that a configuration other than the above-described configurations may be added to the configuration of each device (or each processing unit). Moreover, when the configuration and operation as the entire system are substantially the same, a part of the configuration of a certain device (or processing unit) may be included in the configuration of another device (or another processing unit).

Furthermore, for example, the above-described programs may be executed in an arbitrary device. In this case, the device is only required to have a necessary function (functional block and the like) and obtain necessary information.

Furthermore, for example, each step in one flowchart may be executed by one device, or may be executed by being shared by a plurality of devices. Moreover, in a case where a plurality of pieces of processing is included in one step, the plurality of pieces of processing may be executed by one device, or may be shared and executed by a plurality of devices. In other words, a plurality of pieces of processing included in one step can be executed as a plurality of steps. Conversely, the processes described as the plurality of the steps can also be collectively executed as one Step.

Furthermore, for example, in a program executed by the computer, processing of steps describing the program may be executed in a time-series order in the order described in the present specification, or may be executed in parallel or individually at a required timing such as when a call is made. That is, as long as there is no contradiction, the processing of each step may be executed in an order different from the above-described order. Moreover, the processes in the steps describing the program may be executed in parallel with processes of another program, or may be executed in combination with processes of the other program.

Furthermore, for example, a plurality of technologies related to the present technology can be implemented independently as a single entity as long as there is no contradiction. It goes without saying that any plurality of present technologies can be implemented in combination. For example, a part or all of the present technologies described in any of the embodiments can be implemented in combination with a part or all of the present technologies described in other embodiments. Furthermore, a part or all of any of the above-described present technologies can be implemented together with another technology that is not described above.

Note that the present technology can also have the following configurations.

(1) An information processing device including:

an authentication unit that authenticates an authentication device associated with a user;

a content information generation unit that generates content information according to an operation of the user; and a content information file generation unit that generates a content information file that stores the content information and user information of the user in a case where the authentication device is authenticated.

(2) The information processing device according to (1), further including a registration unit that registers device identification information of the authentication device and an authentication device public key unique to the authentication device, in which the authentication unit authenticates the authentication device using the device identification information and the authentication device public key registered by the registration unit.

(3) The information processing device according to (2), in which the registration unit further registers the user information, and the content information file generation unit stores the user information registered by the registration unit in the content information file in a case where the authentication device is authenticated.

(4) The information processing device according to (2), in which the content information file generation unit stores the user information supplied from the authentication device in the content information file in a case where the authentication device is authenticated.

(5) The information processing device according to any one of (1) to (4), in which the user information includes identification information of the user and an electronic signature of the identification information of the user.

(6) The information processing device according to any one of (1) to (4), in which the authentication unit, after authenticating the authentication device, regularly or irregularly repeatedly confirms whether the authentication device can communicate with the information processing device and whether the authentication device is located within a predetermined distance from the information processing device.

(7) The information processing device according to (6), in which the authentication unit cancels authentication of the authentication device in a case where it is determined that the authentication device cannot communicate with the information processing device, or in a case where a notification indicating that the authentication device is away from the information processing device by a predetermined distance or more is received from the authentication device.

(8) The information processing device according to any one of (1) to (4), in which the content information file generation unit generates an electronic signature using the content information, the user information, and a private key unique to the information processing device, and stores the electronic signature in the content information file.

(9) The information processing device according to (8), in which the content information file generation unit stores a certificate including a public key corresponding to the private key in the content information file.

(10) The information processing device according to any one of (1) to (4), in which the content information generation unit captures an image of a subject according to an operation of the user, and generates the captured image as the content information, and the content information file generation unit generates, as the content information file, an image file that stores the captured image and the user information.

(11) An information processing method including:

authenticating an authentication device associated with a user;

generating content information according to an operation of the user; and generating a content information file that stores the content information and user information of the user in a case where the authentication device is authenticated.

(12) An information processing device including:

a communication unit that communicates with another device; and a confirmation unit that regularly or irregularly repeatedly confirms whether a distance to the another device is closer than a predetermined threshold using communication with the another device, in which the confirmation unit makes a notification to the another device via the communication unit in a case of determining that the distance is more than or equal to the threshold.

(13) The information processing device according to (12), further including an authentication unit that causes the another device to authenticate the information processing device by transmitting identification information of the information processing device and information encrypted using a private key unique to the information processing device to the another device via the communication unit.

(14) The information processing device according to (13), further including a biometric authentication unit that performs authentication of the user by using biometric information of the user, wherein the authentication unit encrypts the information using the private key and transmits the encrypted information to the another device via the communication unit in a case where the user is authenticated by the biometric authentication unit.

(15) An information processing method including:

by using communication with another device, regularly or irregularly repeatedly confirming whether a distance to the another device is closer than a predetermined threshold, and making a notification to the another device in a case where it is determined that the distance is more than or equal to the threshold.

(16) An information processing device including a verification unit that verifies, by using user information stored in a content information file, whether a creator of content information stored in the content information file is valid.

(17) The information processing device according to (16), further including an issuance unit that issues the user information, in which the verification unit determines that the creator is valid in a case where the user information included in the content information file is the user information issued by the issuance unit.

(18) The information processing device according to (17), in which the user information includes user identification information and an electronic signature generated by using the user identification information and a private key unique to the information processing device, and the verification unit verifies whether the user information included in the content information file is the user information issued by the issuance unit using the user information and a public key corresponding to the private key.

(19) An information processing method including verifying, by using user information stored in a content information file, whether a creator of content information stored in the content information file is valid.

(20) An information processing system including a content information generation device and a verification device, in which the content information generation device includes:

a content information generation unit that generates content information according to an operation of a user;

an authentication unit that authenticates an authentication device associated with the user; and a content information file generation unit that, in a case where the authentication device is authenticated, generates a content information file that stores the content information and user information of the user supplied from the authentication device, and the verification device includes a verification unit that verifies whether a creator of the content information included in the content information file is valid using the user information included in the content information file.

REFERENCE SIGNS LIST

100 Image processing system
101 Image management server
102 Authentication device
103 Imaging device
110 Network
131 Communication unit
132 User information issuance unit
133 Image contributor verification unit
134 Storage unit
151 Communication unit
152 Issuance processing unit
153 Registration processing unit
154 User authentication processing unit
155 Confirmation unit
156 Storage unit
171 Communication unit
172 Registration unit
173 User authentication unit
174 Imaging control unit
175 Image file generation unit
176 Upload unit
177 Storage unit
178 UI unit
179 Imaging unit
200 User information
201 User ID
202 User electronic signature
221 Registration data
230 Image file
231 Image data
232 User information
233 Camera electronic signature
234 Camera certificate
301 Biometric authentication unit
321 Biometric authentication unit
401 Registration data
900 Computer

The invention claimed is:

1. An information processing device comprising:

a memory storing a program, and at least one processor configured to execute the program to perform operations comprising:

authenticating an authentication device associated with a user;

generating content information according to an operation of the user; and generating a content information file that stores the content information and user information of the user only when the authentication device is authenticated, wherein the user information is embedded within the content information file as a data field.

2. The information processing device according to claim 1, wherein the operations further comprise:

registering device identification information of the authentication device and an authentication device public key unique to the authentication device; and authenticating the authentication device using the device identification information and the authentication device public key.

3. The information processing device according to claim 2, wherein the operations further comprise:

registering the user information; and storing the registered user information in the content information file in a case where the authentication device is authenticated.

4. The information processing device according to claim 2, wherein the operations further comprise:

storing the user information supplied from the authentication device in the content information file in a case where the authentication device is authenticated.

5. The information processing device according to claim 1, wherein the user information includes identification information of the user and an electronic signature of the identification information of the user.

6. The information processing device according to claim 1, wherein the operations further comprise:

after authenticating the authentication device, repeatedly confirming whether the authentication device can communicate with the information processing device and whether the authentication device is located within a predetermined distance from the information processing device.

7. The information processing device according to claim 6, wherein the operations further comprise:

cancelling authentication of the authentication device in a case where it is determined that the authentication device cannot communicate with the information processing device, or in a case where a notification indicating that the authentication device is away from the information processing device by a predetermined distance or more is received from the authentication device.

8. The information processing device according to claim 1, wherein the operations further comprise:

generating an electronic signature using the content information, the user information, and a private key unique to the information processing device, and storing the electronic signature in the content information file.

9. The information processing device according to claim 8, wherein the operations further comprise:

storing a certificate including a public key corresponding to the private key in the content information file.

10. The information processing device according to claim 1, wherein the operations further comprise:

capturing an image of a subject according to an operation of the user, and generates the captured image as the content information; and generating, as the content information file, an image file that stores the captured image and the user information.

11. An information processing method comprising:

authenticating an authentication device associated with a user;

generating content information according to an operation of the user; and generating a content information file that stores the content information and user information of the user only when the authentication device is authenticated, wherein the user information is embedded within the content information file as a data field.

12. An information processing device comprising:

a memory storing a program, and at least one processor configured to execute the program to perform operations comprising:

communicating with another device;

repeatedly confirming whether a distance to the another device is closer than a predetermined threshold using communication with the another device; and sending a notification message to the another device in a case of determining that the distance is more than or equal to the threshold, wherein the notification message is configured to cause the another device to perform a predetermined action that is based upon proximity.

13. The information processing device according to claim 12, wherein the operations further comprise:

causing the another device to authenticate the information processing device by transmitting identification information of the information processing device and information encrypted using a private key unique to the information processing device to the another device.

14. The information processing device according to claim 13, wherein the operations further comprise:

performing authentication of a user by using biometric information of the user; and encrypting the information using the private key and transmits the encrypted information to the another device in a case where the user is authenticated.

15. An information processing method for an information processing device, the method comprising:

communicating with another device;

repeatedly confirming whether a distance to the another device is closer than a predetermined threshold; and sending a notification message to the another device in a case where it is determined that the distance is more than or equal to the threshold, wherein the notification message is configured to cause the another device to perform a predetermined action that is based upon proximity.

16. A non-transitory computer readable medium storing a program, the program being executable by a processor to perform operations comprising:

authenticating an authentication device associated with a user;

generating content information according to an operation of the user; and generating a content information file that stores the content information and user information of the user only when the authentication device is authenticated, wherein the user information is embedded within the content information file as a data field.

17. A non-transitory computer readable medium storing a program for controlling an information processing device, the program being executable by a processor to perform operations comprising:

communicating with another device;

repeatedly confirming whether a distance to the another device is closer than a predetermined threshold; and sending a notification message to the another device in a case where it is determined that the distance is more than or equal to the threshold, wherein the notification message is configured to cause the another device to perform a predetermined action that is based upon proximity.

* * * * *